United States Patent [19]

Matson

[11] Patent Number: 5,100,555

[45] Date of Patent: Mar. 31, 1992

[54] METHOD AND SYSTEM FOR REMOVING RADON FROM RADON CONTAINING WATER

[76] Inventor: Stephen L. Matson, 15 Withington La., Harvard, Mass. 01451

[21] Appl. No.: 539,005

[22] Filed: Jun. 15, 1990

[51] Int. Cl.$^5$ ............................................. B01D 61/00
[52] U.S. Cl. ...................... 210/651; 210/653; 210/321.84; 210/321.87; 210/490; 210/500.27; 210/500.4; 55/16; 55/47; 55/66; 55/158
[58] Field of Search ............. 210/651, 652, 771, 772, 210/747, 221.2, 673, 490, 500.42, 500.35, 640, 137; 55/47, 5, 16, 17, 169, 66, 62, 165; 98/42.07; 250/255, 253; 423/262; 264/222

[56] References Cited

U.S. PATENT DOCUMENTS

| | | | |
|---|---|---|---|
| H808 | 8/1990 | Siemer et al. | 423/262 |
| 3,650,093 | 3/1972 | Rosenberg | 55/159 |
| 4,064,436 | 12/1977 | Ward, III | 55/16 |
| 4,230,463 | 10/1980 | Henis et al. | 55/16 |
| 4,371,383 | 2/1983 | Rost | 55/169 |
| 4,756,724 | 7/1988 | Yuill | 55/165 |
| 4,789,468 | 12/1988 | Sirkar | 210/137 |
| 4,812,648 | 3/1989 | Perlman | 250/255 |
| 4,849,111 | 7/1989 | Abrams | 210/673 |
| 4,931,181 | 6/1990 | Blume et al. | 210/500.27 |
| 4,961,759 | 10/1990 | Taylor | 55/16 |

OTHER PUBLICATIONS

Takahara, *Kyoto Daigaku Genshiro Jikkensho Tech. Report,* KURRI-T-310 (1988).
Matson et al., *Chem. Eng. Sci.,* 38(4):503–524 (1983).
Yamamoto et al., *J. of Nucl. Sci. and Tech.,* 25(3):289–294 (1988).
EPA Publication No. OPA-87-011 (1987).
Lowry et al., *J. Amer. Waterworks Assoc.,* 79(4):162–169 (1987).
Ramachandran et al., *Nucl. Tracks Radiat. Meas.,* 15(1):81–84 (1987).
Hafez et al., *Nucl. Tracks Radiat.,* 12(1–6):697–700 (1986).

(List continued on next page.)

Primary Examiner—Robert A. Dawson
Assistant Examiner—Ana Fortuna
Attorney, Agent, or Firm—Hamilton, Brook, Smith & Reynolds

[57] ABSTRACT

Method and apparatus are described for removing dissolved radon gas from water for the purpose of reducing the exposure of household occupants to elevated airborne Rn levels, using a radon-permeable membrane at the interface between gaseous and liquid process streams. The membranes are permeable to the passage of radon gas but substantially impermeable to the passage of the bulk phases. Water is passed along one surface of a membrane in a high-surface-area membrane module, while stripping air is passed along the second surface of the membrane. Radon diffuses from the water stream into the stripping air. The membranes allow rapid and efficient mass transfer in compact devices. The stripping air stream is preferably maintained at a pressure substantially below that of the water undergoing treatment and is supplied to the membrane stripping module by a low-pressure fan or by a blower. Hollow-fiber and other high-surface-area (e.g., tubular, flat-sheet, and spiral-wound) membrane modules are suited to the practice of the invention; hollow fibers provide significant advantages in terms of low cost and high packaging density. The water undergoing treatment may be recirculated between the membrane module and a storage tank or accumulator. Membranes suitable for the practice of the present invention may be (i) dense, polymeric membranes of silicone rubber and various of its copolymers (e.g., the block copolymer formed from polydimethylsiloxane and polycarbonate) and (ii) hydrophobic, microporous membranes prepared from such non-wetting polymers as polytetrafluoroethylene (PTFE) and polypropylene (PP). Porous membranes may be either isotropic or asymmetric. Non-porous or "dense" membranes may either be self-supporting or supported. Preferred are "composite" membranes consisting of a dense film residing atop or within a porous support membrane.

28 Claims, 5 Drawing Sheets

OTHER PUBLICATIONS

Lowry et al., *J. Env. Eng.*, 111(4):511–527 (1985).
Jha et al., *Health Physics*, 42(5):723–725 (1982).
Hammon et al., *J. of App. Polymer Sci.*, 21:1989–1997 (1977).
Ward, III et al., *Rev. Sci. Inst.*, 48(11):1440–1441 (1977).
Ohno et al., *Radiochem. Radioanal. Letters*, 27(5–6):299–306 (1976).
Kiani et al., *J. of Membrane Sci.*, 20:125–145 (1984).
Basu et al., *AIChE J.* 36(3):450–560 (1990).
Prasad et al., *J. of Membrane Sci.*, 47:235–259 (1989).
Zander et al., *J. Amer. Waterworks Assoc.*, 81(11):76–81 (1989).
Zander et al., *J. Env. Eng.*, 115(4):768–784 (1989).
Yang et al., *AIChE J.* 32(11):1910–1916 (1986).
Qi et al., *J. of Membrane Sci.*, 23:321–332 (1985).
Qi et al., *J. of Membrane Sci.*, 23:333–345 (1985).
Yang et al., *J. of Membrane Sci.*, 42:273–284 (1989).
Coté et al., *J. of Membrane Sci.*, 47:91–106 (1989).
Tang et al., *AIChE J.* 22(6):1000–1006 (1976).

METHOD AND SYSTEM FOR REMOVING RADON FROM RADON CONTAINING WATER

1.0. BACKGROUND OF THE INVENTION

1.1. Radon in Indoor Air

Radon-222 has been identified as a pervasive pollutant in indoor air. Radon is now known to be responsible for the majority (55%) of the ionizing radiation dose which individuals receive from all sources —both natural and man-made—and it has been amply demonstrated that exposure to elevated levels of this gas in household air is associated with increased incidence of lung cancer (1).

Radon (Rn) is a naturally occurring element that is formed upon the radioactive decay of radium-226. It exists as a gas in the form of three isotopes—Rn-219, Rn-220, and Rn-222. The former two isotopes have half-lives of the order of seconds and thus are of little concern. However, radon-226 decays in a slower process that is characterized by a considerably longer half-life of 3.82 days. Radon decay proceeds with emission of alpha particle radiation through a series of solid, short-lived radioisotopes (e.g., polonium-218 and polonium-214) that are collectively referred to as radon "daughters" or progeny.

These radon daughters, which are unstable isotopes in their own right, are responsible for most of the radiation dose associated with high radon levels in air. Most radon gas that is inhaled is generally exhaled as well since its radioactive half-life is long as compared to the residence time of the gas in the lungs. However, the above-mentioned alpha-emitting polonium isotopes are solids rather than gases, and a fraction of these radon daughters are deposited on the surfaces of the airways deep in the lung when air is inhaled. The radon progeny deposited in this manner subsequently decay by emission of short-range but slow-moving and powerful alpha particles capable of damaging cells which they encounter. This alpha radiation dose is efficiently delivered to the cancer-generating stem cells present in the epithelium that comprises the surface of the air passages in the lungs.

Early EPA estimates indicated that in the United States alone some 5,000 to 20,000 lung cancer deaths a year are attributable to "natural" radon from all sources, and more recent estimates tend to be larger—e.g., between 10,000 and 40,000 lung-cancer deaths each year (2,3). Extensive surveys of radon levels in homes and schools are underway at EPA's urging, based on its finding that some 10% of the nation's homes exceed its 4 picoCuries per liter (pCi/L) action level (4,5). Congress has recently identified a long-term goal of reducing indoor radon concentrations to typical levels in the outside environment (0.1-0.7 pCi/L), and EPA is publicizing Rn mitigation measures (6) and establishing the groundwork for eventual regulations dealing with allowable levels of radon in indoor air and drinking water.

The radon that ultimately enters the home emanates from one of three potential sources: (i) diffusion from soil gas; (ii) release from radon-laden groundwater; and/or (iii) release from radium-containing construction materials (7). The invention disclosed herein addresses the contribution to indoor air pollution from the second source—namely, waterborne radon.

1.2. Waterborne Radon

While diffusion of radon from soil gas is responsible for the greater health risk, the risk posed by volatile radon gas released into the air from household water can also be significant. By EPA's estimate, some 100 to 1800 lung cancer deaths per year are attributed to indoor air pollution caused by water-borne radon emitted into the air (8). The EPA estimates that radon originating from U.S. public water supplies results in a lifetime lung cancer risk of about 1 in 10,000, which is the highest risk level allowed for any currently regulated contaminants under the Safe Drinking Water Act (9). According to the EPA's Office of Drinking Water, water-borne radon may cause more cancer deaths than all other drinking water contaminants combined (2).

The transfer of radon from water to air depends on several factors—namely, its concentration in water, the quantity of water used, the intensity of agitation, and air and water temperatures. The partitioning of Rn between water and air is described by the Henry's law constant "m" defined as $$m = p/x \, (atm) \tag{1}$$

where p (in atm) is the partial pressure of radon gas in equilibrium with an aqueous solution containing mole fraction x of Rn. A wide range of Henry's law constants (from about 2600 atm to about 6300 atm at ambient temperature) have been published or can be calculated from related measures of radon's water solubility (7, 9-16); a reasonable weighted-average value is about 5000 atm.

Efficiencies of Rn transfer have been reported to range from about 30% (e.g., for drinking and toilet flushing) to about 90% (for laundry and dishwashing) (14) to about 5 to 99% (17-18). Such studies form the basis for the frequently cited "rule of thumb" that about 1 pCi/L of airborne radon will result from using a water supply containing 10,000 pCi/L (8). However, significant deviations from this rule of thumb can exist (14). For example, water-to-airborne radon concentration ratios can vary over a 50-fold range and are strongly dependent on air change rate (9); in an extreme case, as much as 5.1 pCi/L of airborne radon might result from a water supply containing 10,000 pCi/L of dissolved Rn. It has also been reported that radon levels in occupied apartments can be four to five times those in vacant ones, presumably due to water use in the former (19).

EPA estimates that some eight million citizens may be at risk from high radon levels in small community water systems and private wells. Several surveys have been published (7, 10-11, 20-21). As early as 1961, 228 wells in Maine and 26 wells in New Hampshire had been reported to average 53,000 and 101,000 pCi/L, respectively (22). By 1987, wells with waterborne radon levels in excess of 50,000 pCi/L had been reported in 10 states, and 100,000 pCi/L wells had been reported in seven (10). Private wells containing over a million pCi/L have been found, with radon in wells drilled in Maine in granitic formations reportedly averaging 22,000 pCi/L. The American Water Works Company system has estimated that if the EPA were to adopt a maximum allowable radon contaminant level in the range of 100-1000 pCi/L, some three-quarters of its supplies would require treatment to meet that standard (20). Finally, it has been estimated (11) that as many as 10-50% of the 45,000 public drinking water supplies based on groundwater may require some form of treatment to comply with anticipated regulations, and the number of individual problem wells is obviously much greater still.

1.3 Prior-Art Approaches to Waterborne Radon Reduction

Removal of radon from water is now generally accomplished either by granular activated carbon (GAC) adsorption or by aeration (8, 23). Both technologies are effective but suffer from serious drawbacks.

Granulated activated carbon adsorption

Adsorption is the most thoroughly studied and currently the most used approach (7, 10). In these systems, dissolved radon gas is physically adsorbed on a packed bed of high-surface-area activated carbon; this adsorbed radon decays to produce nonvolatile species that are retained on the bed, with the result that the adsorptive capacity of the GAC for radon is regenerated. Although "under-the-sink" carbon filters are too small to be effective (2, 24), properly designed and operated 1.5-2.0 cubic foot GAC tanks are capable of reducing waterborne radon levels by 90% from 100,000 to 10,000 pCi/L. A 3.0 cubic foot unit is capable of treating 250 gallons per day (GPD) of 1,000,000 pCi/L water (8).

While admittedly effective, GAC adsorption exhibits several major and minor drawbacks (7-10). The equipment is not insignificant in size or cost, and the activated carbon medium is capable of supporting bacterial growth that can lead to microbiological contamination. Plugging of the bed with iron and sediments can occur, with the result that the unit must be protected by a cartridge prefilter which itself requires periodic replacement. Even so, backwashing may be required at intervals.

Perhaps the most troublesome disadvantage of GAC adsorption, however, relates to accumulation on the bed of other radionuclides that emit gamma radiation, some of which (e.g., Pb-210 and Po-210) are long-lived (7-8, 10). Treatment of high-radon-content water can require either shielding of the GAC tank or, in extreme cases, location of the tank outside the house. In addition to the safety issue that this poses, disposal of the spent carbon at the end of its life as a low-level radioactive waste poses still other problems.

Aeration

Aeration can take one of two forms—(i) spray aeration by means of nozzles or splash plates (25), or (ii) diffused bubble aeration (FIG. 1) wherein air is compressed and introduced at the bottom of a water tank 11 that also provides some storage capacity. Diffused bubble aeration has been investigated in both batch and continuous-flow modes of operation and found capable of 80 to 95% or higher radon reductions (7, 9-10). FIG. 1 illustrates a typical diffused-bubble aeration system. Such a system includes a source 12 of raw water pumped by a first pump 13 and a source 14 of air (compressor or pump) supplying an air diffuser 15 at the bottom of the tank 11. This side of the system is controlled by a pump level control box 16, a variable timer 17, and an air flow regulator 18. It is provided with liquid level probes 19 and an outside vent 20 for air-stripped Radon.

Aeration has the significant advantage relative to GAC adsorption of avoiding a radioactivity/disposal issue. However, this advantage is gained at the price of greater system complexity and a cost that is considerably higher than that of GAC units (2). Some of this additional complexity is associated with the second water pressurization that is required (i.e., a second pump 21 is needed as well a hydropneumatic tank 22 with an outlet 23 to household water use), since aeration is conducted at atmospheric pressure. Moreover, since the head of water must be overcome, the cost of pressurizing the stripping air with a compressor or pump is not insignificant. Annual operating costs for individual aeration systems are typically about twice those associated with GAC units (9), and aeration systems can be large and noisy.

Finally, we note that aeration appears superior to GAC adsorption where treatment of groundwater supplies distributed by relatively small community water systems is concerned. On the one hand, the long "empty bed contact time" (EBCT) that would be required with GAC adsorption renders this approach impractical, and the large size of the bed would further aggravate the ultimate GAC disposal problem. Both packed-tower aerators and cascading tray aerators have been investigated (20, 26).

In conclusion, what is clearly needed is an improved approach for removing radon from small water systems and private wells that addresses the above-cited limitations of conventional GAC and aeration systems.

Particularly advantageous in mitigating the health effects attributable to indoor air pollution caused by waterborne radon would be an improved aeration system characterized by the following benefits:

High radon removal efficiency
Simple, compact, quiet, and rugged
Low capital and operating cost
Capable of operation with pressurized water and ambient pressure air
Wide operating range
No radioactivity buildup or GAC disposal problem
Operating lifetime not limited by sorption of organic contaminants or microbial growth The membrane stripping method and apparatus of the present invention are capable of providing these benefits relative to conventional aeration and GAC radon removal systems and processes of the prior art.

Additional background information and references related to the present invention are brought to the attention of the U.S. Patent and Trademark Office in an accompanying Information Disclosure Statement submitted with the present application. This Information Disclosure Statement is incorporated in its entirety by reference herein.

It is known that synthetic polymeric membranes and various processes based on them can be used to effect the separation and removal of components from both liquid and gaseous mixtures. The more pertinent aspects of this field of art are reviewed in the accompanying Information Disclosure Statement incorporated by reference herein. However, heretofore the use of membranes in an air stripping process has neither been suggested nor demonstrated in the prior art for the removal of dissolved radon gas from water—the subject of the present invention.

2.0. SUMMARY OF THE INVENTION

Briefly stated, the present invention pertains to method and apparatus for removing dissolved radon gas from water for the purpose of reducing the exposure of household occupants to elevated airborne Rn levels. Of particular interest is the application of the present invention to the treatment of water from individual household wells and small municipal or community wells based on groundwater supplies.

The method and apparatus of the present invention for removal of waterborne radon are depicted in FIG. 2. Radon removal is accomplished by a novel membrane-mediated air stripping process which is based on deploying a radon-permeable membrane at the interface between gaseous and liquid process streams—i.e., between stripping air at near-ambient pressure and water undergoing treatment at or near the normal water supply system pressure. Membranes suitable for use in the present invention will always have in common the property of their being highly permeable to the passage of radon gas while being substantially impermeable to the passage of either of the bulk phases (i.e., water and stripping air) which they contact under their conditions of use as specified further below.

In operation, water (e.g., from a well) is passed along one surface of a membrane in a high-surface-area membrane module, while stripping air is passed along the second surface of the membrane. Radon diffuses from the water stream into the stripping air. A sufficient area of Rn-permeable membrane and a sufficient flowrate of stripping air are provided to ensure that the desired degree of radon removal is accomplished at a reasonable rate from a given amount or flowrate of water to be treated. Membranes are attractive in this application because they can allow rapid and efficient mass transfer in compact devices. Moreover, they are immune from flooding and channeling problems, and they are capable of operating effectively both at very small scales (pertinent to household applications) and over a wide range of air and water flowrate ratios.

The Rn-permeable membrane of the present invention serves to permit selective transport of radon gas from the water being treated to the stripping air stream, while simultaneously contacting and separating said air and water phases in a high-surface-area membrane device. More specifically, the present process involves the removal of dissolved radon gas from radon-laden water by its transfer across a suitable membrane and into a stripping air stream that is subsequently safely discharged to the outdoors. Radon transport occurs in a series of three steps: (i) diffusion of dissolved radon gas from the "bulk" water stream undergoing treatment across an aqueous-phase "boundary layer" or "stagnant film" to a first surface of a radon-permeable, bulk-water-and-air-impermeable membrane; (ii) partitioning of radon gas into the membrane, and its diffusive permeation across said membrane under the influence of a transmembrane gradient in its chemical potential; and (iii) its subsequent release from the membrane and diffusion into the stripping air stream (generally with negligible mass transfer resistance) in contact with a second surface of said membrane. It should be noted that the membrane's property of being impermeable to bulk water and air transport is defined in the context of the specific type of membrane being used and the specific conditions of its use, as discussed further in Section 4.0 below. Moreover, it should be noted that the transport of radon from water to stripping air occurs by diffusion rather than by convection. Despite the fact that a pressure difference is generally maintained across the membrane, no pressure-driven, convective transport of radon occurs in the practice of the present invention.

It is a novel and particularly useful feature of the membrane-based air stripping process of the present invention that the stripping air stream can be maintained at a pressure substantially below that of the water undergoing treatment; typically, it will be supplied to the membrane stripping module either by a low-pressure fan or by a blower. In contrast, aeration processes of the prior art generally require that the well water first be depressurized and subsequently stripped at near-atmospheric pressure—as opposed to being treated at the elevated pressure of the household water supply as is made possible by the present invention. To do otherwise with conventional aeration methods and equipment would previously have entailed the provision of a compressor to pressurize and deliver stripping air at high pressure, which adds aeration system capital and operating costs and operating/maintenance complexities that have proven to be unacceptable in practice. It may be further noted that stripping air for use in the present process may be withdrawn either from inside or outside the house and employed without any elaborate pretreatment.

This invention is capable of being carried out with membranes having a variety of forms and configurations. For instance, hollow-fiber and other high-surface-area (e.g., tubular, flat-sheet, and spiral-wound) membrane modules are particularly suited to the practice of the invention, although hollow fibers provide significant advantages in terms of low cost and high packaging density. Hollow-fiber membrane devices resemble shell-and-tube heat exchangers in construction, wherein typically polymeric hollow fibers replace the heat transfer tubes. These fibers generally have inner diameters (IDs) ranging from about 100 to 1000 microns, with fiber wall thicknesses varying from about 25 to 250 microns as a rule. Values for membrane surface area per volume of typical membrane devices range from about 30 $cm^2/cm^3$ to about 100 $cm^2/cm^3$ (1200 to 4000 $ft^2/ft^3$). To provide some perspective, note that a hollow-fiber artificial kidney for hemodialysis typically contains 1 $m^2$ (11 ft ) of fiber area in a 9-inch-long shell about 1.5 inch in diameter.

As regards module design and flow configuration, it is essential only that the membrane device be provided with two inlet and two exit ports for the supply and withdrawal of air and water streams from the respective sides of the membrane contained therein. Air and water flows through the module may either be countercurrent, crosscurrent, or cocurrent—although in principle the countercurrent flow configuration will have a modest advantage in radon removal efficiency at very low air stripping flowrates. While the stripping air will normally flow only once through the device, water may pass through the device on a once-through basis or, alternatively, it may be recirculated many times between the membrane module and a storage tank or accumulator connected to the membrane stripping device via a circulating pump.

Membranes suitable for the practice of the present invention may be either porous or non-porous, and they may be fabricated from various materials in various morphologies, physical forms, and geometries. Two types of membranes that have been found by experiment (see Section 5.0 below) to be particularly useful are (i) dense, polymeric membranes comprised of silicone rubber and various of its copolymers (e.g., the block copolymer formed from polydimethylsiloxane and polycarbonate) and (ii) hydrophobic, microporous membranes prepared from such non-wetting polymers as polytetrafluoroethylene (PTFE) and polypropylene (PP). Porous membranes may be either isotropic (i.e., possessing substantially uniform-sized pores throughout the membrane matrix), or they may be asymmetric (i.e., exhibiting substantial variation in pore size across the thickness of the membrane). Nonporous or "dense" membranes may either be self-supporting or supported, with the so-called "composite" membranes consisting of a dense film residing atop or within a porous support membrane (usually prepared from a different material) being particularly advantageous.

The membrane stripping method and apparatus of the present invention provide a simple, compact, economical, quiet, and efficient means for the removal of dissolved radon gas from water that alleviates or eliminates many of the disadvantages of the prior-art aeration and carbon adsorption processes that have been used for this purpose in the past.

3.0. BRIEF DESCRIPTION OF THE FIGURES

The invention may be more readily understood by reference to the following detailed description of the invention and figures, in which FIG. 1 is a schematic representation of a conventional diffused-bubble aeration system of the prior art for removal of dissolved radon gas from groundwater;

4.0. DETAILED DESCRIPTION OF THE INVENTION

4.1. System Design Considerations

4.1.1. The Membrane Stripping Concept for Radon Removal

Figure 2:
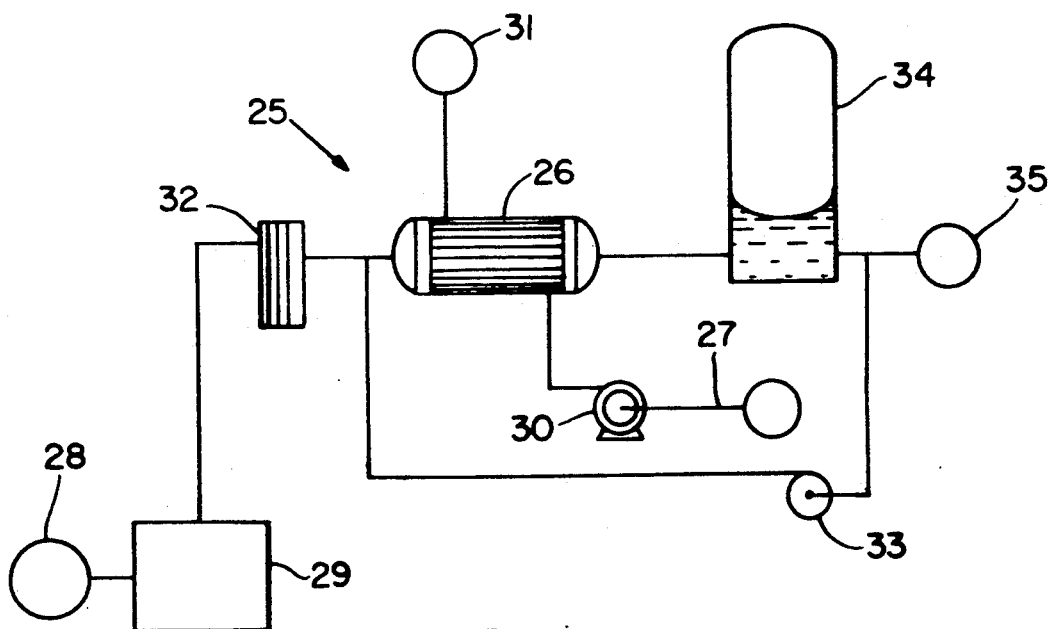
FIG. 2 is a schematic representation of one embodiment of the membrane stripping system of the present invention for the removal of waterborne radon gas.

As introduced in Section 2.0, a membrane stripping system 25 suitable for removal of waterborne radon and attendant reduction of indoor air pollution levels is shown in FIG. 2. At its heart is a high-surface-area (e.g., hollow-fiber) membrane module 26 that contacts radon-rich groundwater with a stream of air 27 that serves to carry, by means of a vent 31, the permeated radon gas from the home. In the continuous process shown in the figure, groundwater 28 with a high radon concentration is supplied at a normal system pressure of approximately 10 to 100 psig (and more typically 20 to 80 psig) by the well pump 29, and it maintains this pressure (except for a modest pressure drop in the pipes and across the membrane device) during its treatment and subsequent distribution within the home. Stripping air is supplied either from within the home or outside of it at a pressure only slightly above atmospheric pressure by a low-pressure and inexpensive fan or air blower 30 with minimal power consumption.

In some embodiments the system may be optionally provided with a water pre-treatment filter cartridge 32. Also a recirculation circuit may optionally be provided incorporating a pump 33 and a hydropneumatic tank 34. The tank 34 may be located between the membrane module 26 and the outlet 35 to the house for radon-free water as shown in FIG. 2, or the tank 34 may be located elsewhere in the recirculation circuit.

Figure 1:
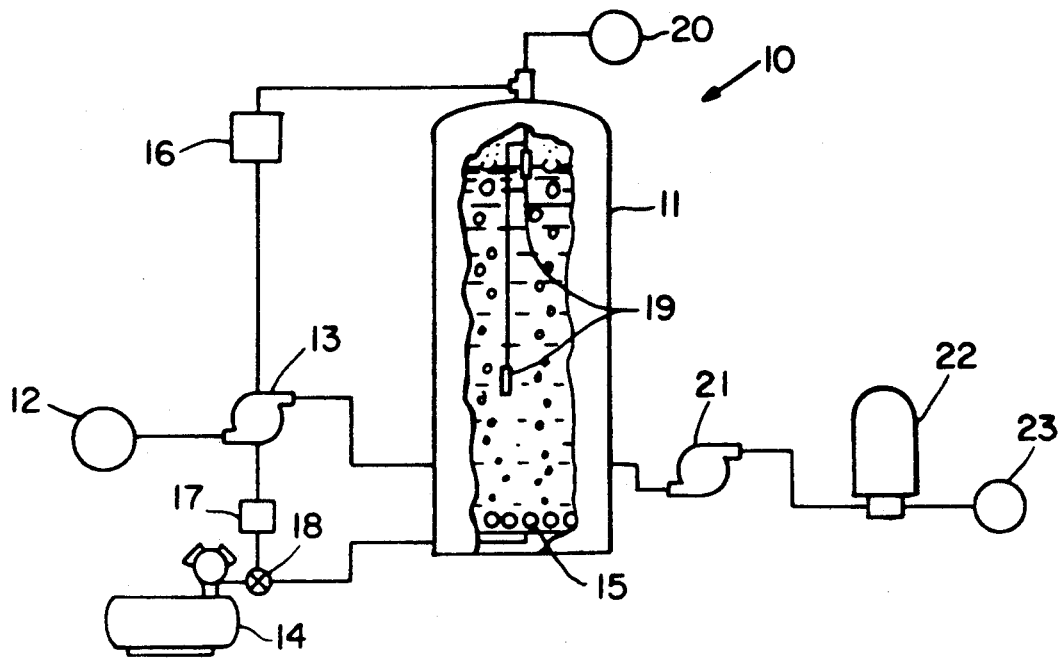

While the system is similar in operation to conventional diffused bubble aeration in some respects, it is strikingly different in others. For example, stripping air need not be supplied at a pressure sufficient to overcome the water head associated with an aeration tank (see FIG. 1), since in the process of the present invention water and air streams flow on opposite sides of a membrane. This phase-separating membrane serves to support any pressure difference applied across it, subject to limits associated with the mechanical strength of the membrane and by wettability considerations for microporous membranes as discussed further in Section 4.2.2 below. By the same token, the proposed system obviates the need for a second water pump as is required in conventional diffused bubble aeration systems to repressurize the treated water—i.e., to bring it up to the pressure required for its subsequent distribution in the home. Moreover, relatively low air flowrates suffice in a membrane-mediated stripping process as compared to those employed in diffused bubble aeration processes of the prior art where both the air/water interfacial area and the radon mass transfer coefficient have been shown to be strongly dependent on stripping air flowrate (10). In contrast, the amount of membrane packaged in the membrane device determines the effective interfacial contact area in a membrane stripping system, and both this area and the overall radon mass transfer coefficient are quite insensitive to the flowrate of stripping air employed.

4.1.2. Flux and System Design Equations

The basic equation describing the transmembrane radon flux from water to stripping air is given by $$N = K_1(C_1 - K_{eq}C_g) \;[=]\; g\text{-}mol/cm^2\text{-}sec \qquad (2)$$

where K, (cm/sec) is an overall mass transfer coefficient based on liquid-phase concentrations, $C_1$ and $C_g$ are liquid-and gas-phase radon concentrations expressed in g-mols/cm$^3$ and $K_{eq}$ is a dimensionless radon partition coefficient defined as $$K_{eq} = C_1)_{eq}/C_g)_{eq} \qquad (3)$$

The term $(C_1 - K_{eq}C_g)$ in equation (2) describes the overall radon concentration difference that is responsible for transport of this gas from water to air. The term $K_{eq}C_g$ may be thought of as a "back-pressure" term which acts to reduce this overall concentration difference; it is simply the concentration of radon in water in local equilibrium with the stripping air in contact with the opposite membrane surface at any point in the membrane stripping device. The equilibrium constant of equation (3) is simply the "coefficient of solubility" as defined, for example, in Reference 9; it can be related to the Henry's law constant "m" of equation (1) by the expression $$K_{eq} = C_t R T/m \qquad (4)$$

where $C_t$ is the concentration of liquid water (0.055 g-mols/cm$^3$).

The design of a membrane stripper for removal of waterborne radon is simplified by the facts that (i) $K_{eq}$ is only about 0.25 and (ii) the typical gas-phase radon concentrations ($C_g$) of several to tens of pCi/L that will be encountered when indoor stripping air is employed will typically be several orders of magnitude lower than the liquid-phase Rn concentration $C_1$ found in the water undergoing treatment (e.g., at least several thousand pCi/L). In instances where outside air is employed in the membrane stripping process, this gaseous radon concentration $C_g$ will be even lower still, given that the average radon concentration in outside air is about 0.05 pCi/L. Accordingly, relatively low volumetric flowrates of stripping air—even if supplied from inside the home (e.g., the basement where the water tank is typically located) as opposed to from outside the home—will suffice to efficiently carry off the stripped radon gas. Since the "back-pressure" term in equation (2) is usually insignificant, the flux equation can generally be simplified as follows:

$$N = K_1 C_1 \;[=]\; g\text{-}mol/cm^2\text{-}sec \qquad (5)$$

It remains to evaluate the overall liquid-phase mass transfer coefficient $K_1$ (27–31). The corresponding overall resistance (1/$K_1$) may be viewed as the sum of the individual aqueous-phase, membrane, and gas-phase resistances:

$$1/K_1 = (1/k_1) + (1/k_m) + (K_{eq}/k_g) \qquad (6)$$

where $k_1$ and $k_g$ are the individual liquid- and gas-phase mass transfer coefficients in cm/sec (27, 32), and $k_m$ is an effective membrane permeability.

In stripping a volatile gas such as Rn from water, the air-phase resistance is typically negligible. [In the present case, the dimensionless stripping factor "m $k_g/k_1$" as defined by King (32) is of order 30,000, attesting to the fact that the liquid-phase mass transfer resistance is "controlling" (i.e., that the liquid-phase diffusional resistance dominates over that afforded by the gas phase).] It is critical to achievement of suitably high radon stripping rates that the membrane resistance 1/$k_m$ also be acceptably small, since the required membrane area will vary inversely with the overall mass transport coefficient $K_1$ which is dependent upon it. Ideally, the aqueous-phase mass transfer resistance will be minimized by optimal membrane stripping device design, while the membrane transport resistance will be minimized by choice of the proper membrane.

The membrane stripping module can be sized by integration of the following differential mass balance equation:

$$V_f(dC_1/dA) = -N \qquad (7)$$

where $V_f$ is the volumetric water feed flowrate (cm$^3$/sec), dA is the differential membrane contactor area (cm$^2$), and N is the Rn flux. Substitution for N and integration yields the following expression relating inlet and outlet aqueous-phase radon concentrations to water flowrate, overall mass transfer coefficient, and membrane area:

$$\ln(C_{1,in}/C_{1,out}) = K_1 A/V_f \qquad (8)$$

Thus, the fractional removal "X" of waterborne radon that can be accomplished in a single pass through the membrane stripping device is given by the equation $$X = 1 - \exp[-K_1 A/V_f] \qquad (9)$$

This is the critical device design equation which is useful in the specification of the membrane area required in a given waterborne radon removal application (see also Section 4.3).

Both hydrophobic microporous membranes and dense polymeric ones are suitable for stripping radon from water, as discussed in considerable detail in Section 4.2. For now, we turn to the matter of the typical magnitude of the aqueous-phase mass transfer coefficient $k_1$ that may be expected to describe this important step in the overall process of radon transport from water to stripping air.

4.1.3. Typical Aqueous-Phase Mass Transfer Coefficients

Under certain circumstances (i.e., with proper membrane selection), both the gas-phase and membrane-phase mass transfer resistances can be negligible as compared to the aqueous-phase "boundary layer" resistance to radon transport. In this situation, the overall mass transfer coefficient $K_1$ will be closely approximated by the individual aqueous-phase coefficient $k_1$. In any event, the overall coefficient will be strongly dependent on the aqueous-phase coefficient through equation (6) above.

Because of the central importance of $k_1$ to the performance and size of a membrane stripper, the present section is devoted to survey of mass transfer correlations with which this coefficient can be estimated for a wide range of membrane device configurations and operating conditions. In Section 5.0, experimental measurements of the overall radon transport coefficient $K_1$ are provided for selected types of membranes and module designs.

To first order, $k_1$ may be expressed as a ratio of the molecular diffusivity of dissolved radon gas in water (estimated using the Wilke-Chang equation to be $1.4 \times 10^{-5}$ cm$^2$/sec at 20 C) to an effective boundary layer thickness which is dependent on flow velocity, hollow-fiber or flow-channel dimensions, and the direction of water flow past the membrane surface. For example, the assumption of a 50 micron effective boundary layer thickness yields an estimated value for the liquid-phase Rn mass transfer coefficient of 0.0028 cm/sec. More rigorous theoretical analyses yield correlations of a dimensionless Sherwood number (Sh) as a function of a dimensionless Reynolds number (denoted as Re, which describes the ratio of inertial forces to viscous forces acting on a fluid element) and a dimensionless Schmidt number (Sc, suggestive of the relative importance of viscous and diffusive effects). The Sherwood number, which is directly proportional to the aqueous-phase mass transfer coefficient $K_1$, is defined as $$Sh = (k_1 d/D) \qquad (10)$$

while the Reynolds and Schmidt numbers take the forms $$Re = d\, V_1/\mu \text{ and } Sc = \mu/D \qquad (11)$$

where "d" is the diameter of the flow conduit (i.e., the hollow fiber inner diameter in centimeters), $V_1$ is a representative fluid velocity (cm/sec), $\mu$ is the kinematic viscosity of the fluid (i.e., water in this case, about 0.01 cm²/sec), and D is the molecular diffusivity of the solute in the fluid (i.e., of Rn in water, in units of cm²/sec). In cases where the fluid is directed through a flow channel which is not cylindrical (i.e., flow outside hollow fibers or within the channels of a spiral-wound flat-sheet membrane module), it is common to use an equivalent or "hydraulic" diameter $d_h$ in place of "d" in equation (10), where this hydraulic diameter is defined as follows:

$$d_h = 4\,[(cross\text{-}sectional\ area)/(wetted\ perimeter)] \qquad (12)$$

(This expression reduces to the inner diameter d for the case of flow down the bore or lumen of a hollow-fiber membrane.)

Sherwood number correlations useful in the estimation of $k_1$ generally take the following form:

$$Sh = a\, Re^x\, Sc^y \qquad (13)$$

where a is a proportionality constant and x and y are exponents that describe the sensitivity of the Sherwood number to the Reynolds and Schmidt numbers. A particular Sherwood number correlation that is especially useful in describing mass transfer in membrane devices (27) is given by the expressions $$Sh = 1.38\, Re^{0.34}\, Sc^{0.33} \qquad (14)$$

$$(k_1 d/D) = 1.38\, (d\, V_1/\mu)^{0.34}\, (\mu/D)^{0.33} \qquad (15)$$

Obviously, higher flow velocities and smaller fiber dimensions produce higher mass transfer coefficients, but this improvement is gained at the expense of aggravating water-side pressure drops. (Among other things, this suggests the adoption of relatively stubby membrane modules to keep pressure drops to acceptably low values.)

Neither calculated nor experimental values for the aqueous-phase mass transfer coefficient of radon have previously appeared in the published literature. However, there are many such values given for more generally encountered solutes—especially, oxygen. Liquid-phase coefficients for oxygen and other small solutes appear, for example, in papers by Cussler (27–28) and Cote et al. (30); several of these are summarized in Table I below for oxygen transport in devices based on hollow-fiber membranes and various flow configurations.

TABLE I.

EXPERIMENTAL & ESTIMATED WATER-SIDE MASS
MASS TRANSFER COEFFICIENTS FOR OXYGEN

| Configuration | $V_1$ (cm/sec) | Re | Dia. (μm) | $k_1$ (cm/sec) | Ref. |
|---|---|---|---|---|---|
| outside, crossflow | 10 | — | 100 | 0.050 | 27 |
| outside, parallel | 10 | — | 100 | 0.01 | 27 |
| inside, axial | 10 | — | 100 | 0.005 | 27 |
| outside, crossflow | 4.2 | — | 250 (OD) | 0.015 | 28 |
| inside, axial | 50. | — | 200 (ID) | 0.0055 | 28 |
| inside, axial | — | 0.6 | 305 (ID) | 0.0014 | 30 |
| inside, axial | — | 49.0 | 305 (ID) | 0.0059 | 30 |

It can be seen from the data and calculations for $O_2$ reported in Table I that values for this gas' mass transfer coefficient $k_1$ as low as 0.0014 and as high as 0.015–0.050 cm/sec are anticipated for various fiber/module designs and flow velocities. Moreover, while the mass transfer coefficients of Table I are for oxygen gas, they are indicative of the size of the $k_1$ values that might be expected for dissolved radon gas as well. In this regard, it should be noted that $k_1$ varies with 2/3 power of diffusivity accordingly to equation (15). Thus, it should be anticipated that $k_1$ values for radon gas should be about 80% those of measured or calculated for $O_2$ at equivalent conditions—i.e., from about 0.001 to about 0.04 cm/sec.

It is instructive to compare these predicted aqueous-phase mass transfer coefficients for radon gas with calculated and/or experimentally measured membrane-phase ($k_m$) or overall ($K_1$) mass transfer coefficients as reported in Sections 4.2 and 5.0 below.

4.2. Suitable Membrane Types

In principle, three different types of radon-permeable, phase-separating/contacting membranes will have utility in the practice of the present invention:

(i) dense or nonporous membranes of various polymer compositions—typically rubbers, but preferably silicone rubber (e.g., polydimethylsiloxane or PDMS) and certain of its solvent-castable copolymers (e.g., the block copolymer of PDMS and bisphenol-A polycarbonate);

(ii) microporous membranes, preferably hydrophobic ones comprised typically of PTFE or PP that will resist wetting by the water stream undergoing treatment; and (iii) immobilized liquid membranes (ILMs) consisting of various water-immiscible silicone fluids immobilized by capillarity within the pores of microporous support films.

Each of these types of membranes and conditions for their use in the practice of the invention are described in Sections 4.2.1 to 4.2.3 below.

4.2.1. Nonporous or "Dense" Polymeric Films

Figure 3:
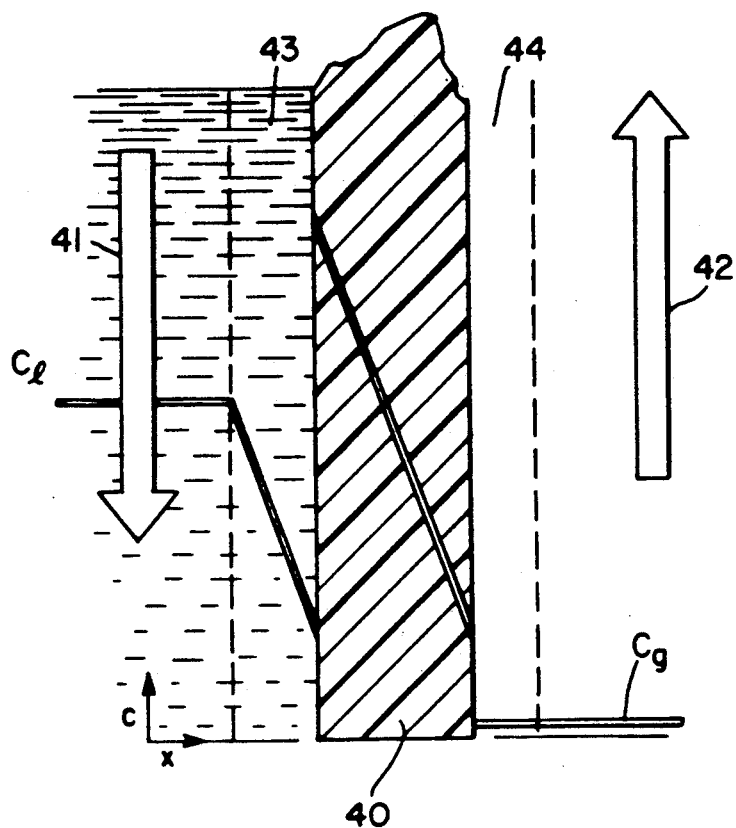
FIG. 3 is a cross-sectional view of a dense membrane (e.g., polydimethylsiloxane rubber or one of its copolymers) illustrating the various steps involved in the transport of radon-222 from the water being treated to the stripping air stream.

FIG. 3 is a cross-sectional view of a dense membrane 40 (e.g., dimethylsiloxane rubber or one of its copolymers) illustrating the various steps involved in the transport of radon-222 from the water 41 being treated to the stripping air stream 42.

The reduction of the bulk water concentration $C_l$ of radon is reduced by the steps of: diffusion of radon across the aqueous-phase boundary layer 43 (or "stagnant film"), partitioning of radon into the membrane 40, diffusion across the membrane, partitioning of radon into the air stripping stream through the "stagnant air film" 44 (where there is only small transfer resistance), and diffusion into the bulk air stream 42 at a new lower concentration, $C_g$.

Nonporous membranes (also referred to as "dense" membranes) are typically comprised of polymeric compositions that are extruded, blown, coated, or cast into the form of thin films, flat sheets, tubes, or fibers by a variety of fabrication techniques that are well known in the art of membrane technology (33-34). Nonporous membranes clearly possess the characteristic essential to the operability of the present invention of their being impervious to the pressure-driven bulk flow of air and water from one membrane surface to the other. Even when a substantial pressure difference is applied in either direction across such nonporous membranes, there will be established only a relatively minor diffusive permeation of water vapor and/or of the air gases across suitably nonporous membranes; convective flow of water and/or air will not occur so long as the applied pressure difference is not so great as to cause mechanical rupture of the film. Note that while dense membranes are capable of being operated with either the water or the air stream at the higher pressure, it will generally be preferred to have the water at the higher pressure and to use near-atmospheric-pressure air in the stripping process.

Whether a particular nonporous polymeric film will be well suited for use in the process of the present invention will thus depend primarily on its diffusive permeability to radon gas originating from the water undergoing treatment, as well as on the effective thickness of the polymeric membrane It is generally recognized that transport of gases through nonporous polymeric membranes occurs by a solution-diffusion mechanism. A gas present on one side of a membrane first dissolves into the polymeric film, diffuses down its concentration gradient to the lower-partial-pressure side of the membrane, and then desorbs Under ideal circumstances (e.g., applicability of Henry's Law), the permeability (P) of a membrane is given by the product of the molecular diffusivity (D) and solubility (S) of the gas in the membrane material.

Permeability is a extraordinarily complex function of the nature of the diffusing gas (e.g., molecular dimensions, condensability, etc.), properties of the polymer (e.g., rubbery or glassy, amorphous or crystalline, and its processing history) and the nature of the physicochemical interaction between the permeating gas and the polymer, among other things. Thus, it is perhaps not surprising that there is, as of yet, no satisfactory theoretical approach or methodology by which the permeability of a particular polymer to a specific gas can be predicted from first principles with much of any confidence—even at ideal conditions of low permeant partial pressure, with the polymer in its "equilibrium" state, and in the absence of other components capable of interacting with the membrane matrix and other diffusing components (34-36).

What can be said about the prediction of gas/membrane permeabilities amounts to generalizations of various sorts. For instance, rubbery polymers (i.e., polymers used at temperatures above their glass transition temperatures, $T > T_g$) are generally known to be more permeable than are glassy polymers (for which $T < T_g$). Moreover, amorphous polymers are usually more permeable than crystalline ones. However, the situation vis-a-vis the effect of the nature of particular permeants is somewhat more complicated and even less predictable. For instance, many very small gas molecules (e.g., $H_2$ and He) exhibit high permeabilities in many polymeric materials as a consequence of their small size and thus their relatively large mobility or diffusivity in the polymer matrix. At the same time, however, certain relatively large permeants (e.g., $CO_2$)—and especially condensible vapors such as $H_2O$ and organic solvents—exhibit relatively large permeabilities in spite of their size because they are highly condensible and soluble in certain membrane polymers. For molecules of intermediate size, it is more difficult to generalize since the effects of molecular size on permeant mobility and solubility are in opposition to one another, and the existence of specific permeant/polymer interactions cannot safely be ignored.

It can be seen from the above that values for the permeation coefficients "Pr" of gases in polymeric membranes must generally be measured experimentally. A number of standard methods and apparatus for the measurement of gas permeabilities are known in the art. In many cases, such measurements are made by mounting a sample of the membrane material (e.g., a flat sheet) in a gas-tight permeation cell of a convenient size, and then applying a high pressure of the gas of interest to the feed-side compartment of the test cell; sometimes a vacuum is maintained on the permeate side of the cell. The rate of gas permeation into the low-pressure compartment is determined by measuring upstream and/or downstream compartment pressures (e.g., by capacitance manometry), by determining the flow of permeating gas if the downstream compartment of the test cell is at atmospheric pressure (e.g., with a soap bubble or other type of flowmeter), or by other like procedures. The standard unit of gas permeability is the Barrer, defined as the ratio of the gas flux [in units of $cm^3(STP)/cm^2$-sec)] to the gradient in partial pressure of the permeating gas maintained across the membrane (in units of cm Hg/cm):

$$1 \text{ Barrer} = 10^{-10} \text{ cm}^3(STP)\text{-cm/cm}^2\text{-sec-cmHg}$$

(Note that for historical reasons, it is also common to find permeability coefficients reported in units of $10^{-9}$ $cm^3$-cm/$cm^2$-sec-cmHg, and still other units are occasionally employed ) We further note that the permeability may also be expressed in terms of an effective membrane diffusivity "$D_m$" ($cm^2$/sec) by means of the equation $$D_m = 76 \, Pr \qquad (16)$$

The membrane's mass transfer coefficient $k_m$ [see Section 4.1.2 above] may then be calculated as the ratio of this membrane diffusivity to the membrane's effective thickness "L" as summarized by the expression $$k_m = D_m/L \quad (17)$$

As discussed above, the reciprocal of this membrane mass transfer coefficient provides a measure of the resistance to overall radon transport which is contributed by the process of membrane permeation.

It may be anticipated that a large number of nonporous polymeric films will not be applicable in the present membrane stripping invention for waterborne radon removal for the reason that their mass transfer resistance will be excessive—that is, their permeability to radon will be lower than desired for the economical practice of the present invention. Generally speaking, rubbery polymers can be expected to exhibit higher radon permeation coefficients than will glassy polymers, but it is also true that thin membranes are more readily fashioned, as a rule, from glassy polymers.

The permeabilities of various nonporous membranes to radon have been measured in several instances—generally in the context of their potential use as barrier films or as elements in track-etch detectors for the measurement of Rn-222 in the presence of "thoron". In the latter application, the membranes serve to pass radon-222 gas while selectively holding back another radon isotope—namely, "thoron" or radon-220. [These membranes are effective barriers for thoron because thoron's radioactive half-life (56 seconds) is short compared to the time constant for transmembrane diffusion, and most of the thoron decays to non-volatile daughters before it can emerge from the membrane. Accordingly, it is only the Rn-222 isotope—which has a half-life of 3.5 days—that is sensed by the track-etch detector.]

Accordingly, several publications (37-40) report measurements of the radon permeability of several types of "anti-thoron" membranes. In most cases, the permeability of Rn has been expressed in terms of its effective diffusivity $D_m$ in the membrane [see equation (17)]. Various membrane polymers for which Rn permeability coefficients have been reported include "rubber" (type unspecified), natural rubber, polyamide, mylar, PVC, cellulosics, polyesters, polycarbonate, polyethylene, a "phenoxy" polymer, and finally a membrane identified only functionally (as opposed to chemically) as an "anti-thoron membrane."

Most of the cited polymers are relatively impermeable to Rn; while they are conceivably of interest as barriers to radon transport in other contexts, they would not be preferred for use in the present invention for the reason that their radon throughput is limited. Among the limited number of polymer compositions for which radon permeabilities have been reported, natural rubber exhibits the highest coefficient with a $D_m$ value of $6.36 \times 10^{-6}$ cm$^2$/sec. (Many polymers exhibit values which are lower than this by one to several orders of magnitude.) Having said this, however, it should be noted that natural rubber has the limitation of being particularly difficult to fabricate into the form of a thin membrane.

Typically, nonporous membranes useful in the practice of the present invention will be characterized by effective membrane diffusivities towards radon of at least about $10^{-7}$ cm$^2$/sec, and preferably at least about $10^{-6}$ cm$^2$/sec. Particularly preferred will be membranes with $D_m$ values for radon of order $10^{-5}$ cm$^2$/sec.

To the best of our knowledge, the permeability to radon gas of membranes comprised of silicone rubber (i.e., polydimethylsiloxane and related compositions) has never been measured or published.

However, this value (i.e., radon's permeability in dimethyl silicone rubber) has been estimated by the present invention by extrapolating the permeability values measured for the other noble gases. Measured permeabilities of silicone rubber to helium, argon, krypton, and xenon (41-43) are shown in Table II, along with values for permeant molecular weight and the Lennard-Jones parameter $\epsilon/k$.

TABLE II.

ESTIMATION OF THE PERMEABILITY OF SILICONE RUBBER TO RADON GAS

| Noble Gas | Molecular Weight | Lennard-Jones Parameter $\epsilon/k$ (K) | Permeability $\times 10^9$ (cm$^3$-cm/sec-cm$^2$-cmHg) |
|---|---|---|---|
| He | 4.0 | 10.2 | 35.5 |
| Ar | 40.0 | 93.3 | 61.3 |
| Kr | 83.8 | 209.4 | 98. |
| Xe | 131.3 | 231. | 203. |
| Rn | 222. | 377.* | 650.** |

*Estimated from critical temp. correlation (4457)
**Extrapolated from semilog plots vs. MW and $\epsilon/k$ By extrapolation of the log of permeability vs. either of these parameters on semilog coordinates we estimate a value for silicone rubber's Rn permeability of several hundred $\times 10^{-9}$ cm$^3$(STP)-cm/sec-cm$^2$-cmHg.

However, in view of the above-cited severe limitations of the theory involved in predicting gas permeabilities and the many exceptions to the general rules and correlations that have been proposed, there is no substitute for experimental measurements. In our experiments presented as the Examples of Section 5.0, we have discovered that silicone rubber and certain of its copolymers are particularly preferred for the practice of the present invention for the reason that such compositions possess a relatively unique combination of desirable properties. More specifically, members of this family of polymers both (i) exhibit extraordinarily high permeabilities to radon gas and (ii) possess the further attractive feature of being amenable to fabrication into thin membranes of various types. While it has previously been suggested that certain silicone-containing polymers might be expected to give permeability-to-flux ratios appropriate to their use as anti-thoron barriers in track-etch detectors (45-46), no direct measurement of the radon permeability of pure silicone or of silicone-based copolymer membranes has heretofore been made. (In this regard, it may be noted that it is the ratio of permeability to thickness—and not the absolute value of either parameter—which determines the utility of a particular membrane as an anti-thoron barrier.)

We have measured the overall mass transfer coefficients of two silicone-based membrane devices used for stripping radon from wellwater. As discussed further below, Example 1 of Section 5.0 reports results obtained with a spiral-wound module containing a 76-micron-thick flat-sheet membrane prepared from pure polydimethylsiloxane rubber. Example 5 describes the fabrication of a composite hollow-fiber membrane module based on a silicone-containing composition—namely, a polydimethylsiloxane/polycarbonate block copolymer, and Example 6 reports its performance in its present application to waterborne radon removal. As summarized in Table X below, overall radon mass transfer coefficients $K_1$ of 0.00223 and 0.00277 cm/sec (0.134 and 0.166 cm/min) were measured for the two membrane devices of Examples 1 and 6, respectively. In the case of the membrane of Example 1 for which the effective membrane thickness is known, it is possible to calculate a lower limit for radon's effective diffusivity in the membrane of $1.7 \times 10^{-5}$ cm$^2$/sec (corresponding to an extraordinarily large Rn permeability for this silicone membrane of some 2240 Barrers). That these values of overall coefficients represent lower limits for the membrane coefficient (and permeability) stems from the fact that the aqueous-phase mass transfer resistance may also be significant [see equation (6)].

It is instructive to compare these measured values of 0.00223 and 0.00227 cm/sec for the overall radon mass transfer coefficients of devices based on pure PDMS and PDMS/PC copolymer membranes with estimates of the aqueous- phase mass transfer coefficients provided in Section 4.1.3 (e.g., in Table I) for various flow and device configurations, on the assumption that the former values reflect the membranes' mass transfer characteristics more than that of the aqueous boundary layer at the conditions of our experiments. The conclusion which can be reached is that the resistance of silicone-based membranes can be small as compared to the aqueous boundary layer mass transfer resistance for certain device configurations and operating conditions—but that the membrane resistance will be a significant contributor to the overall mass transfer resistance with the most mass-transfer-efficient module designs that minimize aqueous-phase diffusional resistance.

In addition to their high radon permeability and relative ease of fabrication into the forms of membranes, another potential advantage of nonporous membranes such as the silicon-based polymers (e.g., siloxanes, alkoxysilanes, and aryloxysilanes) in the present application relates to a potential disadvantage of the porous types of membranes discussed below in Section 4.2.2. In particular, nonporous membranes are immune from the potential problem of long-term wetting by water that will be discussed in the context of microporous membranes used in the present invention, and nonporous membranes—especially silicone-based ones—are expected to be relatively fouling resistant in use, which is important given the premium which the application places on long-term, reliable, and unattended operation of the radon stripping system.

Modules containing pure polydimethylsiloxane rubber membranes are available from several commercial sources. They have been developed for use in such diverse applications as blood oxygenation and cell culture, and they are available in the form of tubes, spiral-wound flat-sheet modules, and hollow-fiber devices from such companies as Sci-Med Life Systems (Minneapolis, Minn.), CD Medical (Miami Lakes, Fla.), and others. A Sci-Med Model No. 0400-2A spiral-wound module was employed in Example 1 described in Section 5.0 below. In addition to the particular silicone rubber with dimethyl substituents on the backbone, a variety of differently substituted silicone rubbers and silane polymers (e.g., with such substituents as fluoro, phenyl, and variously substituted alkyl and aryl groups more generally) are available and, while untested as to their radon permeability, are expected to be useful in the present invention. In this regard, the extensive catalog distributed by Petrarch Systems, Inc. (Bristol, Pa.) and entitled *Silicon Compounds—Register and Review* provides an especially useful source of silicone-based elastomers and related compounds. A variety of curing systems (including room-temperature-vulcanizing or RTV silicone rubbers) will serve as the basis for useful silicone elastomers. Various silane polymers (e.g., polytrimethylvinylsilane, and the like) have also been shown to be highly permeable to many gases, and while their selectivities are generally low, this is of little consequence in the present invention.

Silicone-rubber-based copolymers are particularly preferred as membrane materials in the present invention for the reasons that we have shown experimentally that they exhibit very high permeabilities to radon gas and they are solvent-castable and good film formers——and thus are amenable to use in various membrane coating and casting operations. (The latter characteristics are important in the fabrication of composite membranes, for example.) The particular silicone-containing copolymer used in Examples 4 and 5 of Section 5.0 was obtained as a sample from the Membrane Products Operation of the General Electric Company (Schenectady, NY); that company's designation for this material is "MEM-213." The material is known to consist of a block copolymer of polydimethylsiloxane (PDMS or "silicone rubber") and bisphenol-A polycarbonate (i.e., the material in General Electric's Lexan ® polymer). The dimethyl siloxane content of this material is about 55% by weight (45-46). These copolymers typically have from about $\frac{1}{4}$ to about $\frac{1}{2}$ the permeability of pure silicone rubber to all gases including the noble gases (35, 47-48).

Other commercial sources exist for chemically and functionally similar silicone/polycarbonate copolymers suitable for the preparation of membranes useful in the present invention—e.g., copolymers PS099 and PS099.5 available from Petrarch Systems, Inc. (Bristol, Pa.) which contain 55-60% and 45-50% siloxane by weight, respectively. Still other silicon-based polymer compositions useful in the present invention are disclosed in U.S. Pat. No. 4,781,733 (49).

Silicone rubber membranes can be prepared by any of several techniques well known in the art, including extrusion of hollow fibers or tubes through tube-in-orifice spinerettes and casting of flat sheets from the uncured (i.e., uncrosslinked) precursor or oligomer. Both supported and unsupported membranes will have utility in the application to waterborne radon removal.

Composite membranes

In addition to the dense, homogeneous membranes described above, it is also the case that various composite membranes will be particularly useful in the present radon reduction method. These composite membranes, well known in the art, generally consist of dense films residing atop or within the pores of a microporous support membrane that will generally be prepared from some other (e.g., non-silicone-based) polymer. Suitable porous support membranes may exhibit either the isotropic morphology characteristic of microfiltration (MF) membranes or the asymmetric or "skinned" morphology more typical of ultrafiltration (UF) membranes. Suitable porous support membranes ranging in thickness from about 0.5 to 5 mils (12 to 125 microns) may be prepared from such polymers as polysulfone, polyethersulfone, polyacrylonitrile and its copolymers, cellulose acetate, cellulose triacetate, cellulose butyrate, regenerated cellulose, polyvinylidene fluoride, polyetherimide, polyamide, polyethylene, polypropylene, polytetrafluoroethylene or nylon—so long as the membrane support material is physically and chemically compatible with the conditions of composite membrane fabrication.

Figure 4:
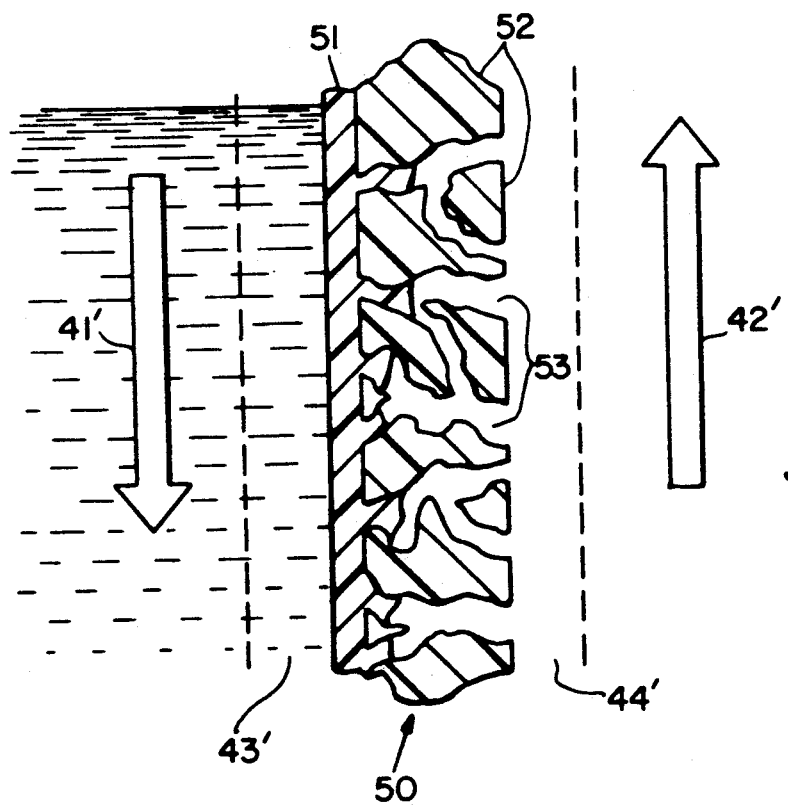
FIG. 4 is a cross-sectional view of a composite membrane (e.g., a film of polydimethylsiloxane rubber or one of its copolymers supported atop and/or within a microporous support film) illustrating the various steps involved in the transport of radon-222 from the water being treated to the stripping air stream.

FIG. 4 is a cross-sectional view of a composite membrane 50 (e.g., a surface coating or film 51 of dimethylsiloxane rubber, one of its copolymers, or some other suitably Rn-permeable polymer supported atop and/or within a microporous support film 52 of a different matrix polymer) illustrating the various steps involved in the transport of radon-222 from the water 41' being treated to the stripping air stream 42, Again the radon diffuses across the aqueous boundary layer 43', partitions into the dense film 51, diffuses through the dense film (either directly to the stagnant gas film 44' if the dense polymer fills the micropores, or into air-filled pores 53 if the dense material only partially penetrates the pores as in FIG. 4), and is carried away by the stripping air stream 42'.

Composite membranes may be prepared in a number of ways. Certain procedures rely on interfacial polymerization of a siloxane or silane-based polymer at one surface of a suitable support membrane (49.) Similar interfacially polymerized thin-film-composite membranes prepared from polyamides are commonly used, for example, in reverse osmosis since extremely small effective membrane thicknesses can be attained with this procedure. However, much simpler composite membrane fabrication techniques based upon the solution or emulsion coating of a silicone-containing prepolymer or polymer within or upon one surface of a porous support membrane serve equally well in the present invention, where the supported silicone-containing film obtained need not be particularly thin in order to yield an acceptably high transmembrane radon fluxes.

Along these lines, perhaps the most promising approach to silicone-rubber-based membranes for use in this application involves the solvent casting of composite membranes from solvent-castable silicone/polycarbonate copolymers such as those available from General Electric (MEM-213) and Petrarch Systems (PS099 and PS099.5) as discussed above. It can be estimated that supported films of these copolymers thinner than about 1 mil or 25 microns should exhibit very desirable Rn transport characteristics in the present application, and even greater thicknesses are acceptable in view of the results of Example 1 as presented in Section 5.0. Generally speaking in most other applications, it is desirable to limit the coating to one surface of the support membrane and thus to keep its thickness as small as possible to maximize flux. However, the permeability of radon gas through the silicone-based copolymers is sufficiently high that even through-coated membranes (i.e., porous membranes completely filled with the silicone rubber material) will be well suited to use in the process of the present invention.

A module-level fiber coating procedure similar to that employed in the fabrication of Monsanto's Prism membrane separators (which consist of silicone-on-polysulfone composite hollow fibers) could be employed in the fabrication of suitable composite membranes (50–51). Alternatively, relatively exotic water-casting procedures available for the production of thin-film-composite membranes from silicone copolymers might be brought to bear (48), but the present application does not require this order of complexity. Particularly preferred as methods for composite membrane fabrication will be solution-casting procedures wherein a suitable organic solution of the desired copolymer (or silicone elastomer) is contacted with a suitably solvent resistant support and is thus deposited within and/or upon the support membrane. Evaporation of the solvent leaves behind a dense film of the radon-permeable membrane.

In Examples 4 and 5 of Section 5.0, we have employed asymmetric (i.e., UF-type) hollow fibers prepared from polyacrylonitrile (PAN) as supports for the silicone-polycarbonate copolymer membrane. This type of support membrane is available commercially in the form of 0.5 to 1.5 $m^2$ hemofiltration modules from Asahi Chemical (Tokyo, Japan), from Sepracor (Marlborough, Mass.) in the form of modules ranging in size from 0.75 to 50 $m^2$, and from other companies. Methylene chloride is a suitable solvent for the membrane coating operation. One of many coating protocols capable of yielding useful silicone-based composite membranes is discussed further in Example 4.

4.2.2. Microporous Membranes

In principle, either hydrophilic or hydrophobic microporous membranes may also be used in the process of the present invention to permit diffusive radon transport while simultaneously separating the aqueous and gaseous phases being brought into transmembrane contact. Phase separation (i.e., prevention of a pressure-driven flux of one of the bulk phases across the membrane) can be achieved by operating with a somewhat higher pressure maintained on that phase (i.e., either air or water) which does not wet the membrane pores. Thus, hydrophobic microporous membranes will be operated with the higher pressure on the water stream, since to do otherwise (i.e., to operate with an air-to-water pressure difference) would lead to the pressure-driven passage of air across the membrane and into the water stream. By the same token, hydrophilic microporous membranes are operated with the higher pressure on the stripping air stream in order to prevent a pressure-driven ultrafiltrative flux of water across the membrane.

Figure 5:
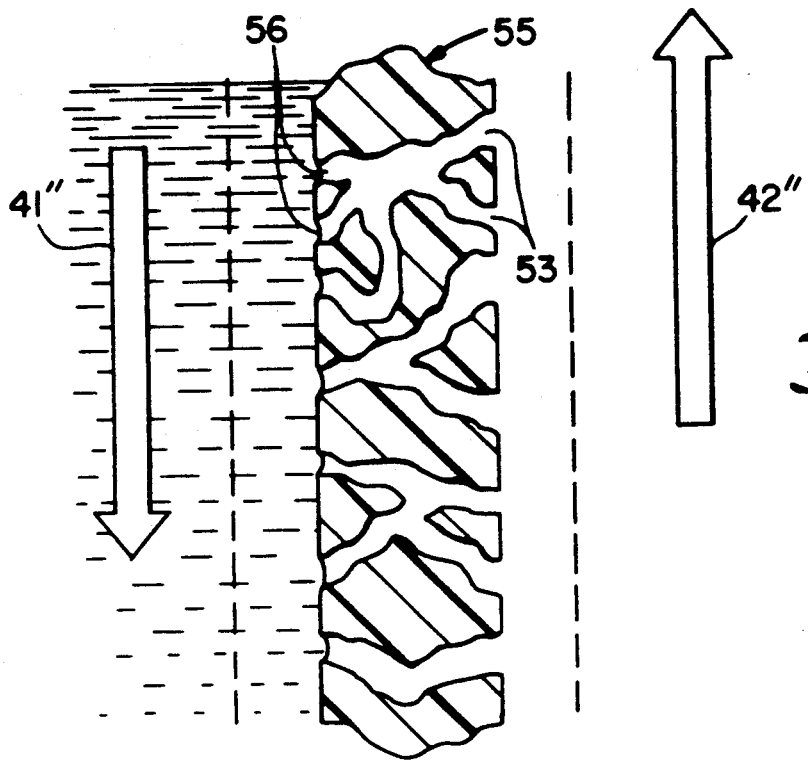
FIG. 5 is a cross-sectional view of a microporous, hydrophobic (i.e., non-water-wetted) membrane as used in the process of the present invention, illustrating the operating pressures and the various steps involved in the transport of radon-222 from the water being treated to the stripping air stream.

FIG. 5 is a cross-sectional view of a microporous, hydrophobic (i.e., non-water-wetted) membrane 55 as used in the process of the present invention, illustrating the operating pressures and the various steps involved in the transport of radon-222 from the water 41" being treated to the stripping air stream 42".

The transfer of radon from water to air takes place at the water/air interface 56 into an air-filled (non-wetted) pore 53, through the pore, and out into the air stream 42,, The water pressure P(41") is greater than the air pressure P(42").

Figure 6:
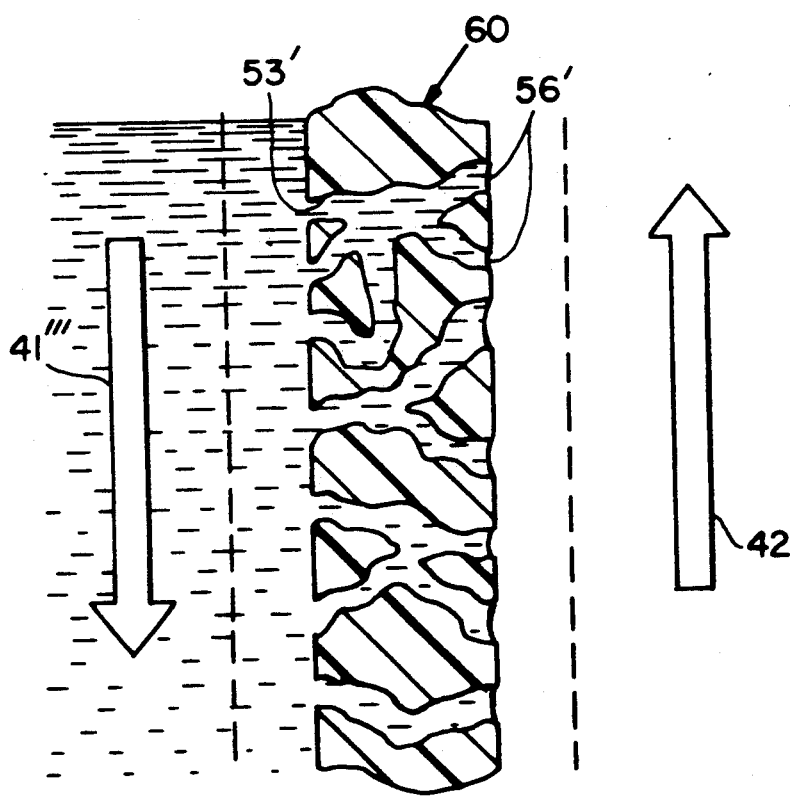
FIG. 6 is a cross-sectional view of a microporous, hydrophilic (i.e., water-wetted) membrane as used in the process of the present invention, illustrating the operating pressures and the various steps involved in the transport of radon-222 from the water being treated to the stripping air stream.

FIG. 6 is a cross-sectional view of a microporous, hydrophilic (i.e., water-wetted) membrane 60 as used in the process of the present invention, illustrating the operating pressures and the various steps involved in the transport of radon-222 from the water 41''' being treated to the stripping air stream 42'''. Now the water/air interface 56' is at the air side of the membrane and the pores 53' are water-filled.

The water pressure P(41''') is less than the air pressure P(42''').

Having said this, however, it is the case that hydrophobic membranes will ordinarily be preferred over hydrophilic ones for two reasons. First, the use of non-wetted hydrophobic membranes (wherein the pores are filled with air) avoids a significant mass transfer resistance incurred in the use of hydrophilic membranes.

Specifically, diffusion of poorly soluble dissolved radon gas across the water that occupies the pores of a water-wetted hydrophilic membrane in use is a very slow process as compared to diffusion through the air which fills the pores of hydrophobic membranes. As shown further below, the resistance to radon permeation of non-wetted hydrophobic membranes is typically negligible in the present application. And secondly, the use of hydrophobic microporous membranes in the radon reduction process permits (and in fact requires) the use of stripping air at a lower pressure than the water pressure, which is desirable for reasons of both practicality and economics.

It should be noted that the terms "microporous" and "porous" are used interchangeably throughout this disclosure; both terms are meant to be descriptive of all types of porous membranes having pore diameters ranging in size from several tenths of a nanometer on up to microns and exhibiting either isotropic or asymmetric morphology. Hence, membranes commonly referred to as "nanofiltration" or "ultrafiltration" membranes are also encompassed by the terms "porous" and "microporous". In fact, there is no practical lower bound on the pore size of membranes useful in the present invention, so long as their effective porosity (and hence their permeability) is sufficiently high. The upper bound on membrane pore size is determined by the requirement that the membrane not be penetrated by the nominally non-wetting fluid under conditions of use. Both of these constraints are discussed further in the following paragraphs.

The permeability of hydrophobic, microporous membranes (which is simply the inverse of their mass transfer resistance) can be calculated from the following equation:

$$k_m = (D \epsilon)/(k_{eg} L \tau) \tag{18}$$

where D is the diffusion coefficient of radon in ambient air [estimated at 0.108 cm$^2$/sec using the procedure of Fuller (44)], and L, $\tau$, and $\epsilon$ represent the thickness, tortuosity, and porosity of the microporous membrane. Membrane thickness will typically range from about 0.5 to about 5 mils; tortuosities will typically range from about 1 to 10; and porosities will generally be in the range of from about 10% to about 90%. Substitution of reasonable combinations of these membrane parameters into equation (18) yields estimates for the effective permeability of non-wetted hydrophobic microporous membranes of the order of about 10 to about 100 cm/sec, values which are several orders of magnitude larger than aqueous-phase mass transfer coefficients reported in Table I above. This analysis leads to the conclusion that the mass transfer resistance of such membranes will be entirely negligible in comparison to the resistance associated with the aqueous-phase boundary layer discussed in Section 4.1.3.

As regards the upper limit on membrane pore size, it will be essential that the nominally non-wetting fluid not penetrate the pores of the membrane during use by displacing that fluid that preferentially wets the membrane material. In the case of a hydrophobic microporous membrane that ordinarily tends to expel water, for instance, this requires that the water-to-air pressure difference applied across the membrane be smaller than the intrusion pressure at which water could be forced into the hydrophobic membrane. This intrusion pressure can be estimated roughly from the Young-LaPlace equation (ignoring pore shape and other secondary effects for the moment):

$$P = 2\sigma\cos(\theta)/R^{pore} \tag{19}$$

where $\sigma$ is the air-water interfacial tension (dynes/cm), $\Theta$ is the air-water contact angle, and $R_{pore}$ is the membrane pore radius (cm). Membrane pore radii of the order of a few tenths of a micron are indicated for the present application, since the water-to-air pressure difference across the membrane will often range from about 5 to 95 psi (e.g., with the water undergoing treatment at distribution pressure and using stripping air at near-atmospheric pressure). For instance, a hydrophobic membrane with 0.1 micron diameter pores has a theoretical intrusion pressure of about 300 psi (about 20 atmospheres) when exposed to "clean" water. However, in practice a substantial safety factor is advisable to account for substantial variations in pore size in a given membrane and to account for the gradual deposition on the membrane pore walls of surface-active contaminants that reduce the hydrophobicity of the membrane (i.e., that lower the interfacial tension $\sigma$). Similar considerations apply to the choice of pore size for hydrophilic membranes, except here it is prevention of intrusion of air into a water-wet membrane that dictates operation below the intrusion pressure upper limit.

In fact, the possibility of gradual membrane fouling and ultimate wetting must be recognized as a potential drawback to the use of microporous membranes in the present application where "dirty" (i.e., foulant- and surfactant-containing) water streams are involved. The membrane must be "rugged" and forgiving from this point of view, inasmuch as extensive water pretreatment is neither affordable nor practical in this application. It is envisioned that microporous hydrophobic membranes may benefit from periodic cleaning and/or treatment with various water-repelling agents (e.g., compounds useful in the "siliconization" or silylation of surfaces) in order to extend their useful non-wetted service life. In this regard, it may be noted that wettability is not an important consideration (or potential problem) where the nonporous membranes of Section 4.2.1 are concerned.

Suitable microporous membranes can be prepared from a large number of organic and inorganic materials, including (without limitation) the various polymers listed in Section 4.2.1 in the context of microporous supports for composite membranes. Because very little radon permeation will occur through the polymer that comprises the solid portion of the microporous membrane matrix, the choice of polymer (or other membrane material) is not particularly crucial from a mass transfer point of view.

A particularly preferred microporous hydrophobic membrane known as "Celgard X20" and commercially available from Hoechst/Celanese's Questar Division (Charlotte, N.C.) is made from polypropylene (28). These fibers have inner diameters ranging from about 100 microns to 400 microns, wall thicknesses of about 1 mil or 25 microns, and porosities ranging from about 20% to 40%. Their mean pore size of about 0.03 microns is more than sufficient to prevent water intrusion at water-side operating pressures of 15 to 75 psi (about 1 to 5 atmospheres gauge) providing that their hydrophobic properties are maintained during extended operation. Other microporous, hydrophobic hollow-fiber membranes prepared from polypropylene and polypropylene/polybutadiene hollow fibers are commercially available from manufacturers that supply membranes for blood oxygenator devices (e.g., Enka, Wuppertal, Germany), and water-wettable grades of the above fibers as well as films are also available (e.g., from Celanese's Questar Division). In Example 2 of Section 5.0, the performance of a hydrophobic, microporous hollow-fiber Questar module based on a polypropylene membrane is determined experimentally. Other potentially suitable hydrophobic, microporous membranes are prepared from PTFE—for example, Gore Associates' "Goretex" membrane (Elkton, Md.) —in the form of tubes, films, and relatively large diameter hollow fibers.

With regard to the choice of hydrophilic membranes, a variety of membrane materials are again available, but for reasons discussed above these will be much poorer performers in radon stripping than their hydrophobic counterparts. For instance, the performance of cellulosic and polyacrylonitrile hydrophilic membranes is explored in Examples 3 and 4, respectively, of Section 5.0 below. Microporous nylon is also a candidate, among others listed in Section 4.2.1 as composite membrane supports.

Procedures for preparing modules containing either nonporous or microporous membranes are straightforward and well known in the membrane art. For example, fabrication of hollow-fiber modules involves potting several thousand fibers in plastic shells fitted with appropriate shell- and lumen-side flow ports. As potting compounds to anchor the fibers, the use of commercial FDA-grade polyurethane and epoxy encapsulants approved for medical devices will generally be indicated so as to avoid any potential issues that might otherwise be caused by the leaching of contaminants from the potting compounds and into the treated water.

4.2.3. Immobilized Liquid Membranes

Yet another embodiment of the process and apparatus of the present invention involves the use of immobilized liquid membranes or ILMs as the radon-permeable, phase-separating membrane interposed between the water stream being treated and the stripping air stream. Briefly stated, immobilized liquid membranes consist of suitable solvents for the permeant—immiscible with both of the process streams in contact with the two surfaces of the ILM—wherein the membrane liquid is immobilized by capillarity within the pores of a suitably microporous support membrane (33, 35). The permeation properties of the membrane (i.e., flux and permselectivity) are those afforded by the membrane liquid, while the mechanical properties and geometry of the membrane are provided by the porous support film or fiber. Immobilized liquid membranes are described, for example, by Robb and Reinhard in U.S. Pat. No. 3,335,545 (52).

Figure 7:
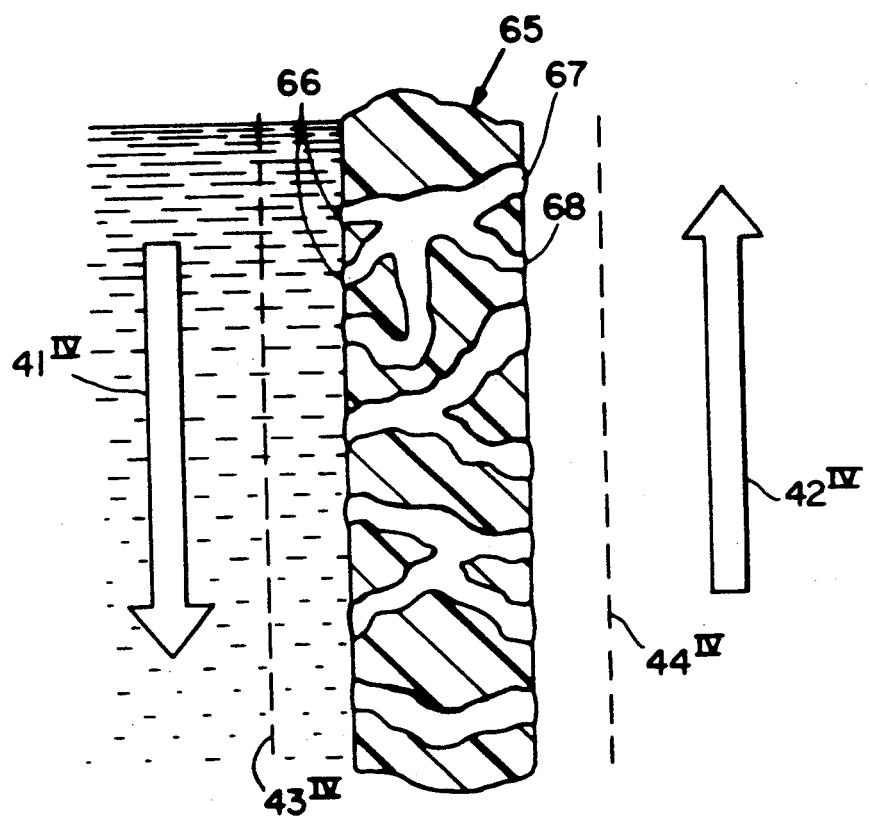
FIG. 7 is a cross-sectional view of an immobilized liquid membrane (ILM) suitable for use in the process of the present invention.

FIG. 7 is a cross-sectional view of an immobilized liquid membrane (ILM) suitable for use in the process of the present invention.

The radon passes from the water stream $41^{IV}$, through the aqueous boundary layer $43^{IV}$, through the solvent-water interface 66, through the water-and-air-immiscible solvent-67 contained in the pores of the matrix polymer which is hydrophobic but wetted by the solvent, through the solvent/air interface 68, through the air-side boundary layer $44^{IV}$, into the air stream $42_{IV}$.

If the membrane liquid is chosen such that the permeant (e.g., radon) has a reasonably high solubility therein (at least compared to its solubility in water), then immobilized liquid membranes have the advantage of being highly permeable as compared to most dense polymeric films, since transport through them occurs by a solution/diffusion mechanism and both permeant solubility and liquid-phase diffusivity can be high. In operation, waterborne radon gas would first partition from water into the solvent entrapped in the ILM, diffuse across the ILM, and then be released to the stripping air stream as suggested in the schematic diagram of FIG. 7. So long as the pressure difference across the membrane is insufficient to cause displacement of the membrane solvent from the pores by either water or air, the ILM configuration will be a mechanically stable. This allowable operating pressure difference (i.e., the intrusion pressure) may be estimated from the Young-LaPlace equation (19) as discussed in Section 4.2.2.

For instance, ILMs suitable for radon stripping will consist of nonvolatile water-immiscible solvents for radon gas entrapped within the pores of a hydrophobic and microporous support membrane (e.g., microporous polypropylene or polytetrafluoroethylene, among many others) These ILM liquids will be substantially insoluble in and immiscible with water, and further they will exhibit very low volatility or vapor pressure such that they will not be lost to either process stream which they contact in use. While many water-immiscible organic liquids are candidates for use in the present invention as judged by these criteria, it should also be recognized that suitable solvents must also be very safe in view of their intimate contact with drinking water. Thus, particularly preferred ILM solvents include the various silicone fluids (e.g. the trimethylsiloxy-terminated polydimethylsiloxane oils) and various halocarbon fluids, certain grades of which enjoy approval by the FDA for use in food and medical applications. Particularly preferred solvents include, for example, Dow-Corning's No. 200 Silicone Fluid (350 centistokes) and Petrarch System's PS038 polydimethyl- silicone oil (5.0 centistokes). Silicone oils with viscosities of at least 350 centistokes are considered suitable for use in food processing by the Food and Drug Administration in concentrations that do not exceed 10 ppm for "ingestion" and 20 ppm for "incidental contact." As an example, food-grade silicone oils are currently used in the wine industry as fermentation antifoam agents Also useful will be members of a family of inert and water-insoluble halocarbons such as those being investigated as artificial blood substitutes.

The solubility of radon in these and other ILM solvents is generally reported in terms of a partition coefficient that describes the effectiveness of the solvent in extracting radon from water This partition (or distribution) coefficient P can be defined as the ratio of organic-phase to aqueous-phase Rn concentrations achieved after the two immiscible phases have come to equilibrium:

$$P = C_{org,eq}/C_{aq,eq} \qquad (20)$$

Such partition coefficients are readily determined in simple extraction experiments wherein a measured volume of radon-bearing water is contacted with a measured volume of initially radon-free solvent in a separatory funnel. The partition coefficient can be calculated from the equilibrium radon concentration left behind in the aqueous phase. The distribution of radon between water and a series of 15 different fluorocarbons has been determined experimentally by Lewis et al. (13); their experimental results can be expressed in terms of partition coefficients defined as per equation (20) which range from about 10 to 42. Certain fluorocarbons—and in particular inert perfluorochemical oils—are of particular interest inasmuch as they are generally regarded as safe for use in such oxygen-carrying applications as artificial blood substitutes, liquid breathing fluids (53) and oxygen carriers for cell culture (54). The solubility of radon in a number of hydrocarbon solvents has also been determined (15-16). As an example, toluene was found to be a relatively good solvent for radon, with a partition coefficient P of about 50; however, toluene would not be acceptable as an ILM solvent in the present invention by reason of its toxicity.

Guidance in terms of the choice of suitable ILM solvents may also be gained from comparison of a solvent's Hildebrand solubility parameter "$\delta$" with that of radon gas; the solubility parameter of radon has been variously reported as 6.8, 8.42 and 8.83 (13, 55-56). Generally speaking, radon will be most soluble in those solvents which are characterized by Hildebrand solubility parameter values that are close to those of Rn itself. For example, the solubility parameter of polydimethylsilicone rubber is reported to be 7.3 by one source (56), and that of liquid-phase "dimethyl siloxanes" is reported to be 4.9-5.9 by another source (57). The latter reference lists the solubility parameters of aliphatic fluorocarbons as being in the range of 5.5 to 6.2, whereas the solubility parameters of the 15 fluorocarbons tests by Lewis and coworkers fall in a range from 5.50 to 8.11. In view of the similarity between the solubility parameters of radon and those of the various silicone and fluorocarbon fluids, one expects that any of these solvents would be reasonably good choices as ILM solvents from the point of view of radon solubility therein..

Techniques for the preparation of immobilized liquid membranes are well known in the art. One starts with a suitably solvent-resistant and hydrophobic microporous support membrane of the types listed in Sections 4.2.1 and 4.2.3 packaged, for example, in a hollow-fiber membrane module. Next, the ILM solvent is passed through the membrane module, permitting it to wet the pores of the support membrane. Finally, the ILM solvent is displaced from the module's flow channels (e.g., the fiber lumens and shell compartment) but not from the support membrane's pores by blowing excess solvent from the module with air or water. Such ILMs may be recharged (e.g., by flushing with fresh solvent) at appropriate intervals if necessary in order to maintain the integrity of the supported liquid film.

4.3. Typical Process Operating Conditions and System Design Configurations

Stripping of waterborne radon is accomplished in the process of the present invention by contacting one surface of a suitably radon-permeable, bulk-fluid-impermeable membrane with radon-containing water while simultaneously contacting the opposite surface of said membrane with stripping gas—preferably, air. The net result is diffusive transport of dissolved radon gas across the phase-separating membrane from the water to the air stream.

It is to be expected that other volatile compounds dissolved in the water stream will also be stripped to a certain extend along with the radon gas. For instance, the preferred membranes chosen for use in the present invention will also be permeable to many volatile organic compounds (VOCs) such as hydrocarbon solvents that also contaminate groundwater supplies. As a result, they will also be stripped from the water stream when the present process is carried out for radon removal, and this may be highly beneficial from the point of view of producing drinking water of acceptable quality.

Water vapor will also be transported across the membrane into the stripping air stream when the vapor pressure of liquid water at its temperature in the stripping module is higher than the partial pressure of water vapor in the stripping air on the opposite side of the membrane. Whether this occurs will depend on the water temperature and stripping air humidity. In the winter when the stripping air can be expected to be relatively dry, co-transport of water vapor can be anticipated; however, in the summer—especially if humid basement air is used to strip relatively cold groundwater, the transport of water vapor could be in the opposite direction. Water vapor transport is essentially of no important consequence to the operation of the present invention in removing dissolved radon.

As discussed in Section 2.0, the water stream undergoing treatment may flow inside or outside of hollow-fiber or tubular membranes, or inside or outside of the envelope in spiral-wound membrane modules Substantially the same flow possibilities exist for the stripping air stream. The flow of water may be cocurrent, crosscurrent, or countercurrent to the flow direction of the stripping air on the opposite side of the membrane. In principle, countercurrent flow will be preferred, but not by a wide margin. Radon-enriched stripping air will typically be exhausted to the outside atmosphere.

In order for a transmembrane flux of radon gas to be established, an adequate driving force for radon transport must exist; this driving force is the difference in the chemical potential or activity of radon gas in the two streams in contact with the membrane. In operation, the chemical potential of dissolved radon gas in the water undergoing treatment will be higher than the chemical potential of radon in the stripping air stream. It is this difference in potential or the effective "concentration" of radon on opposite sides of the membrane that gives rise to its diffusive flux—the magnitude of which is proportional to the size of the transmembrane chemical potential difference. A suitably low concentration or chemical potential of radon gas in the stripping air stream is ensured by maintaining an adequate flowrate of stripping gas relative to the water stream being treated in the membrane module.

In principle, faster rates and higher degrees of radon removal are favored by higher stripping air flowrates. The effect of stripping gas flowrate on flux is reflected in the "back-pressure" term of equation (2) of Section 4.1.2; lower air flowrates give rise to higher airborne radon concentrations $C_g$. However, as a practical matter the concentration of radon present in the stripping gas mixture will typically be so small as to be unimportant at all but the lowest stripping air flowrates. As a general rule, stripping air flowrates of 1 ACFH (actual cubic foot per hour) and higher will be recommended depending on the system configuration, with the invention operating most efficiently at substantially higher stripping air flowrates.

A minimum stripping air flowrate—supplied by a fan, blower, or compressor—will be dictated by the requirement that the airborne radon concentration $C_g$ in the exiting stripping air (arising largely from the transmembrane flux of radon into the stripping gas stream) be maintained at a level lower than that in equilibrium with the water present on the opposite side of the membrane. Preferably, the flowrate of this radon-diluting stripping air stream will be such that the airborne radon concentration will be but a small fraction (e.g., less than 50%, and ideally much less) of the concentration that would be in local equilibrium with the water being stripped to ensure maintenance of an adequate transmembrane driving force and radon flux.

Equation (2) also indicates the level of airborne radon that is tolerable in the incoming stripping air fed to the membrane stripping device. Typically, this inlet airborne radon level will be insignificant, even when basement air is employed as discussed in Section 4.1.2.

Operating pressures—which will be supplied by conventional pumps and manipulated with flow control valves and pressure regulators—have been discussed at length above. To reiterate, nonporous membranes can, in principle, be operated with the higher pressure on either the water or the air side. This flexibility does not exist, however, with microporous membranes, where hydrophobic ones must be operated with the higher pressure on the water stream and hydrophilic ones must be operated with the higher pressure on the stripping air stream. It will further be important with microporous membranes to observe the limits on transmembrane pressure difference imposed by membrane wettability considerations. Having said this, it will generally be preferable to operate the process of the present invention with the water stream undergoing treatment at substantially the pressure at which it is delivered by the wellhead pump (or other groundwater supply system) and subsequently circulated throughout the household—and to operate with stripping air at a pressure much closer to atmospheric pressure. (However, the invention is not limited in this manner.) A fan or blower in the air stripping stream and an optional circulating pump in the water stream compensate for fluid pressure drops through the membrane module and other system plumbing, as suggested in FIG. 2.

The temperature at which the process of the present invention is conducted is not critical. Higher operating temperatures favor somewhat higher rates and degrees of radon removal, since radon's volatility and its rates of diffusion in water and in polymers both increase with temperature. However, as a practical matter it is expected that the system will usually operate without elaborate temperature controls at a temperature dictated by the that of the water supplied to the system.

The membrane area required to treat a given flowrate of radon-containing water to a specified level of radon removal on a single-pass or once-through basis can be calculated from equation (9) above if it is assumed that the "back-pressure" term of equation (2) can safely be neglected. (If this is not the case, then the principles of the analysis remain unchanged but the mathematical detail becomes slightly more cumbersome.) Rearrangement of equation (9) yields the following explicit expression for the required membrane area A as a function of water flowrate $V_f$, the overall liquid-phase mass transfer coefficient $K_l$, and the desired fractional radon removal X:

$$A = -(V_f/K_l) \ln (1-X) \qquad (21)$$

As discussed further in Section 5.0, we have measured overall radon mass transfer coefficients $K_l$ of approximately 0.0025 cm/sec (0.15 cm/min) for two silicone-rubber-based membrane modules (see Examples 1 and 6). In Table III, membrane area requirements calculated from equation (21) using this mass transfer coefficient are presented for three water flowrates (1, 5, and 10 Lpm) and three degrees of radon removal (80, 90, and 95%). Table III also provides an estimate of the packed-fiber volume of hollow-fiber membrane Rn stripping devices based on a quite conservative membrane module surface-area-to-volume ratio of 30 $cm^2/cm^3$ (915 $ft^2/ft^3$) adopted so as to allow for the use of relatively large ID fibers with low water-side axial pressure drops. (It should be noted that the calculated membrane device volumes in Table III correspond only to the volumes of the packed fibers, exclusive of module shell, fittings, and end caps.)

TABLE III.

ESTIMATED MEMBRANE AREA REQUIREMENT AND PACKED-FIBER VOLUME FOR HOLLOW-FIBER DEVICE

| | Membrane Area ($ft^2$) and Volume ($ft^3$) | | |
| --- | --- | --- | --- |
| | Radon Removal Efficiency | | |
| Water Flowrate | 80% | 90% | 95% |
| 1.00 Lpm | 11.6000 $ft^2$ | 16.5000 $ft^2$ | 21.5000 $ft^2$ |
| (0.26 gpm) | 0.0126 $ft^3$ | 0.0181 $ft^3$ | 0.0235 $ft^3$ |
| 5.00 Lpm | 57.8000 $ft^2$ | 82.6000 $ft^2$ | 107.5000 $ft^2$ |
| (1.32 gpm) | 0.0631 $ft^3$ | 0.0903 $ft^3$ | 0.1770 $ft^3$ |
| 10.00 Lpm | 115.5000 $ft^2$ | 165.3000 $ft^2$ | 215.0000 $ft^2$ |
| (2.64 gpm) | 0.1260 $ft^3$ | 0.1810 $ft^3$ | 0.2350 $ft^3$ |

The packed fiber volume of a membrane stripping device is seen to be orders of magnitude smaller (at about 0.01 to 0.2 $ft^3$) than conventional diffused-bubble aeration vessels of similar capacity (at perhaps 5 to 15 $ft^3$) and even GAC beds (typically 1.5 to 3 $ft^3$).

The "ideal" design of a hollow-fiber or other membrane module configuration will take into account a number of interrelated membrane and module parameters. For example, fiber inside diameter relates both to mass transfer performance (since the module's surface-to-volume ratio or packing density varies inversely with fiber ID) and to axial pressure drops (where larger pressure drops are associated with finer fibers). Moreover, the pressure drop associated with passing water at a given flowrate through a membrane contactor of fixed area also depends on the module's aspect ratio—i.e., the ratio of fluid flow path length to module diameter. A number of alternative membrane and module geometries and dimensions will be suitable for the practice of the invention.

It should further be noted that no allowance has been made in the calculations of Table III for the potential "load-leveling" benefit that is obtainable by incorporating a small and inexpensive circulating pump in a loop containing a hydropneumatic storage tank and the membrane stripping module. This configuration, which is optional but shown FIG. 2, can significantly reduce membrane area requirements and module size.

In this regard, we note that Rn-containing water may be treated on a once-through, on-demand basis (i.e., the assumption made in calculating the membrane area requirements of Table III) or, alternatively, this water may continuously be treated with recirculation between a storage tank and the membrane device. Water recycle is but one technique for managing the highly variable demand that will be placed on a membrane stripping system. The recycle mode of operation will result in a reduced membrane area requirement, but at the expense of introducing the need for additional equipment (e.g., a circulating pump) and system controls. Given the modest requirement of the preferred-embodiment system for low-pressure stripping air, the system will most probably be operated with continuous once-through flow of stripping air through the module. However, air and water flow control systems can be incorporated in the apparatus when and if warranted to more efficiently manage fluid flows through the membrane stripping module. The proper design of appropriate fluid management systems and controls will be apparent to those skilled in the art.

Finally, it is likely that application of the present process to removal of Rn from groundwater rich in such potential foulants as waterborne iron, suspended solids, and other such materials will be facilitated by pretreating the radon-containing water with a conventional cartridge filter or other such device. This precaution should extend the useful membrane life and lengthen the operating time interval between cleaning, backflushing, or replacing the membrane device.

In addition to the application of the method and apparatus of the present invention by individual homeowners with private wells, customers of small private and public water systems based on groundwater supplies with high radon levels may also benefit from membrane stripping—either by its use in individual homes or at the site of the private, community, or public water company's facility. Although this application has not been emphasized in the above discussion, it will be clear to those skilled in the art that precisely the same design principles and many of the benefits of membrane-based radon stripping systems will also apply to the invention as operated at this larger scale.

5.0. EXAMPLES

Experimental Apparatus and Procedures

Here we describe the test apparatus used for measuring the effective radon permeability and waterborne radon removal efficiency of membrane modules containing membranes of several different classes. Only minor changes in the test apparatus (e.g., valving) and/or test conditions (e.g., operating pressures) were required to accommodate the several types and sizes of membrane devices employed. Specifically, membrane modules ranging in size from 75 to 15,000 cm$^2$ of effective membrane area were evaluated. Moreover, membranes with a number of membrane chemistries, morphologies, and structures were evaluated as listed below:

hydrophobic and hydrophilic chemistries;
porous and nonporous morphologies; and
isotropic, asymmetric, and composite structures.

Table IV summarizes the membranes and membrane modules employed in reduction to practice of selected embodiments of the present invention.

TABLE IV.

MEMBRANE MODULES CONSTRUCTED AND/OR TESTED FOR RADON REMOVAL EFFICIENCY

| Module Source | Membrane Material | Membrane Type | Membrane Area (cm$^2$) | Flow Pattern |
|---|---|---|---|---|
| Sci-Med 0400-2A | PDMS (hydrophobic) | Nonporous | 4,000 | Cross-Current |
| Questar/Celanese | PP (hydrophobic) | Microporous | 13,000 | Counter-Current |
| Asahi AM-300M | RC (hydrophilic) | Porous (gel-type) | 15,000 | Counter-Current |
| Sepracor Model LP | PAN-based Copolymer (hydrophilic) | Asymmetric, Microporous | 7,500 | Counter-Current |
| Expt'al. Composite | PDMS/PC on PAN Fiber (hydrophobic coating) | Composite (dense coating on porous support) | 75 | Counter-Current |

PDMS: Polydimethylsilicone (polydimethylsiloxane) Rubber
PP: Polypropylene
RC: Regenerated cellulose
PAN: Polyacrylonitrile
PDMS/PC: Polydimethylsiloxane/polycarbonate Block Copolymer (MEM-213, General Electric Company, Schenectady, NY)

With the exception of the spiral-wound flat-sheet membrane packaged in the Sci-Med Model 0400-2A module of Example 1 below, all membranes tested were in the form of hollow fibers that ranged in size from about 200 to about 240 microns inner diameter; hollow fiber wall thicknesses (measured in the water-wet state in the case of swellable hydrophilic membranes) ranged from about 25 to 50 microns. Air and water were directed through these hollow fiber modules in counter-current flow, with the water flowing through the lumen or bores of the hollow fiber and the stripping air directed through the shell-side space in the module. This particular flow configuration was chosen so as to maximize radon mass transfer efficiency as discussed above.

The Sci-Med module of Example 1 was unique in that it contained a flat-sheet membrane (as opposed to hollow fibers) packaged in a spiral-wound configuration; more particularly, it employed a 76-micron-thick film of PDMS silicone rubber. Water was made to flow axially through the Sci-Med unit—i.e., between adjacent turns of the envelope formed by the PDMS membrane and parallel to the axis of the spiral envelope. The stripping air stream was made to execute a spiral flow path within the channel defined by the spacer material within the PDMS membrane envelope. Thus, air and water flows were essentially crosscurrent (as opposed to counter-current) to one another in this module. This module and the membrane contained therein are described in U.S. Pat. Nos. 3,489,647, 3,792,978, 3,819,772, and 3,892,533.

Additional details relating to membrane and module characteristics are provided below in describing individual test conditions and experimental results.

The test apparatus consisted of the several pumps, pressure gauges, valves, tubing, and fittings as were required to supply radon-laden well water and stripping air to membrane modules at various flowrates and pressures; the apparatus permitted independent control of the flowrates and module-exit pressures of both fluid streams. The Rn-containing water supply consisted of wellwater from a residence that was tested by a commercial radon-testing laboratory (Key Technology, Inc., Jonestown, Pa.) and found to contain 15,290 picoCuries per liter (pCi/L) of dissolved radon gas. (This result agrees well with a value of 14,000 pCi/L obtained for the same well about six months earlier.) This feed water, pressurized by the well pump, entered the house at a pressure of about 25-40 psig and was stored briefly (a matter of several minutes) in an accumulator (a hydropneumatic tank) of approximately 40 gallons total capacity. Feed water was subsequently passed through a 5 micron dirt/rust filter (Cuno, Meriden, CT) and from there was directed to the membrane stripping module under test. The feedwater flowrate was controlled by adjustment of a metering valve just upstream of the module, and water exit pressure could be controlled by throttling a second needle valve on the exit line. Inlet and exit water pressures (and thus the water-side pressure drop within the module) could be measured on a single pressure gauge by means of a three-way switching valve arrangement. Since the focus of these experiments was determination of the permeabilities of individual membrane types to dissolved radon gas—and hence their suitability in a membrane stripping process for waterborne Rn reduction—it was unnecessary to operate the test modules at the full pressure of the household water system.

Untreated basement air was used as stripping gas. This air had been previously tested for its radon content over a period of about a year and had been found to contain from about 4 to about 12 pCi/L of Rn gas. However, airborne Rn concentrations of this magnitude have a negligible effect on the performance of a Rn stripping device for reasons related to radon's very favorable water-to-air equilibrium distribution ratio (see above). Stripping air was supplied by an aquarium pump with a maximum output of about 1.7 Lpm when discharging to atmospheric pressure. The flowrate of the stripped water stream exiting the membrane module was measured by collection in graduated cylinders over a timed interval, and the corresponding flowrate of radon-laden air exiting the module was measured by water displacement.

In testing modules that contained membranes that were not wetted by water (i.e., those containing either hydrophobic microporous membrane or nonporous or "dense" membrane), the water stream was maintained at a pressure higher than that of the stripping air stream everywhere in the membrane device—i.e., a positive water-to-air transmembrane pressure difference (typically, a few psi) was maintained. This was accomplished in most experiments by adjusting a throttling valve on the water discharge line from the membrane module, although a static water leg was used to maintain this water discharge head in one instance.

In testing modules that contained membranes that were wet by water (e.g., those housing such hydrophilic membranes as the asymmetric microporous PAN hollow fibers and the gel-type regenerated cellulose fibers), it was necessary to maintain a higher pressure on the stripping air stream than on the water stream in order to prevent pressure-driven ultrafiltrative flow of water across the membrane—i.e., a positive air-to-water transmembrane pressure difference had to be maintained when using these hydrophilic and porous membranes. This was accomplished by adjusting a throttling valve on the air discharge line, while discharging the radon-depleted water stream to atmospheric pressure. A pressure gauge was provided for measurement of inlet air pressure, though the latter value typically did not differ significantly from atmospheric pressure; only with the SciMed Model 0400-2A module was there a significant air-side pressure drop within the membrane module.

Once the desired water and air stream flowrates and operating pressures had been established, the system was allowed to come to steady state, and 1 L samples were collected of both the incoming Rn-containing feed water and the exiting Rn-depleted water that had been air stripped in the membrane device. Typically, the feed water flowrate was varied over a range of about three- to five-fold in order to evaluate the efficiency of a particular membrane module in stripping radon from water passed through the device at various throughputs.

Waterborne Radon Analysis

Concentrations of dissolved radon gas were generally measured using a gamma-counting procedure, calibrated by analysis of duplicate samples submitted to commercial laboratories equipped for measuring waterborne Rn concentrations. Samples of feed water and of air-stripped, Rn-depleted water were collected in 1-liter glass or plastic bottles, taking appropriate precautions to avoid devolatilization and loss of radon gas in the sampling process. Next, approximately 1 gram amounts of granulated activated carbon (GAC), in the form of 1-2 mm diameter particles, were added to the sample bottles with agitation. After a GAC/water contact time of about 6 to 8 hours, during which period the bottles were periodically shaken and much of the dissolved radon gas was adsorbed on the activated carbon and thus concentrated on the solid, the GAC was recovered by filtration and transferred to plastic sample vials for loading into a United Technologies/Packard Multi-Prias Gamma Counting System.

Radon itself is an emitter of alpha radiation and is therefore not directly quantifiable by gamma counting procedures. However, several of the "daughter" products formed upon the radioactive decay of Rn are, in fact, emitters of gamma radiation upon their subsequent decay. This formed the basis for an indirect but accurate and convenient means for measuring dissolved radon concentrations. In particular, this secondary gamma radiation was proportional to the initial concentration of dissolved radon gas in the water sample under analysis, as proven by measurement of waterborne Rn concentrations in feedwater diluted at various ratios with boiled and therefore Rn-free water. With appropriate calibration, this gamma radiation associated with Rn daughters could be used to quantify dissolved radon gas at the levels pertinent to the experiments described below.

GAC samples obtained as described above were counted in the iodine-125 energy window of the Multi-Prias instrument for 15 minute periods, and raw counts were corrected for background radiation by subtraction of "blanks". Typically, gamma counts were accurate to about 5%, and absolute calibration of the analytical procedure was accomplished by gamma analysis of samples that were simultaneously sent to a commercial laboratory for quantification by a standard scintillation counting technique. Multiple feed water analyses were also performed as a part of every membrane module test run. Thus, fractional removal of radon in the membrane devices could have been assessed accurately even if it had not been possible to obtain an absolute calibration of the sensitivity of the gamma-based analytical procedure.

The calibration factor relating gamma counts from the GAC sample to waterborne radon concentration is a function of a number of variables, including the time of exposure of the activated carbon to the water sample, the ratio of GAC to water sample weights, etc. For this reason, individual calibration factors varied slightly from test to test, and accordingly these factors were determined for each membrane stripping module test. A typical calibration factor was 27 pCi/L of dissolved Rn gas per cpm of background-corrected gamma radiation measured at "standard" assay conditions (i.e., 1 L water sample, 1 g of GAC sorbent, 7.5 hours GAC/water contact period, and 15 min count in the $I^{125}$ window of the Multi-Prias gamma counter).

Data Reduction and Analysis

The principal purpose in conducting the experiments described below was to assess the overall radon permeability of stripping modules containing various types of membrane and to determine their relative mass transfer performance. From this information, preferred types of membrane for use in the practice of the invention could be and were identified.

As discussed above, radon transport from water to air in a membrane stripping system is a multistep process wherein three individual transport resistances can, in principle, be identified. In particular, the overall transport resistance $1/K_l$ can be viewed as the sum of individual aqueous-phase, membrane, and gas-phase transport resistances:

$$1/K_l = (1/k_l) + (1/k_m) + (K_{eq}/k_g) \quad (22)$$

where $k_l$ and $k_g$ are the individual liquid- and gas-phase mass transfer coefficients in cm/sec and $k_m$ is an effective membrane permeability (expressions for which have been provided above). It will be recalled that the gas-phase resistance is, for all practical purposes, negligible in the process of the present invention. The objective our of experiments was to determine values of the overall mass transfer coefficient $K_l$ indicative of the radon removal capability of various membrane and module types.

As discussed above, integration of the differential mass balance equation—coupled with the expression for transmembrane radon flux—leads to the following relationship between inlet and exit water-phase Rn concentrations $$\ln (C_{l,in}/C_{l,out}) = K_l A/V_f \quad (23)$$

as a function of overall module mass transfer coefficient, membrane area, and feed water flowrate. This equation may be rearranged as follows in terms of the fraction "X" of Rn removed in the device:

$$\ln (1-X) = -K_l (A/V_f) \quad (24)$$

Thus, theory predicts that a plot of "$1-X$" (i.e., the fraction of Rn remaining) as a function of the membrane-area-to-feed-flowrate ratio "$A/V_f$" should be linear on semi-logarithmic coordinates. Moreover, the negative of the slope of this line should yield the desired overall Rn mass transfer coefficient $K_l$. It will be appreciated that the steeper (i.e., the more negative) the slope, the higher will be the module's overall mass transfer coefficient, and hence the more effective it will be in waterborne radon removal.

By measuring the extent of radon removal at several water flowrates, this theoretical analysis could be (and was) validated. Moreover, this procedure enabled us to achieve good average values of the overall coefficient over a wide range of water flowrates with membrane devices that varied greatly in size.

Figure 8:
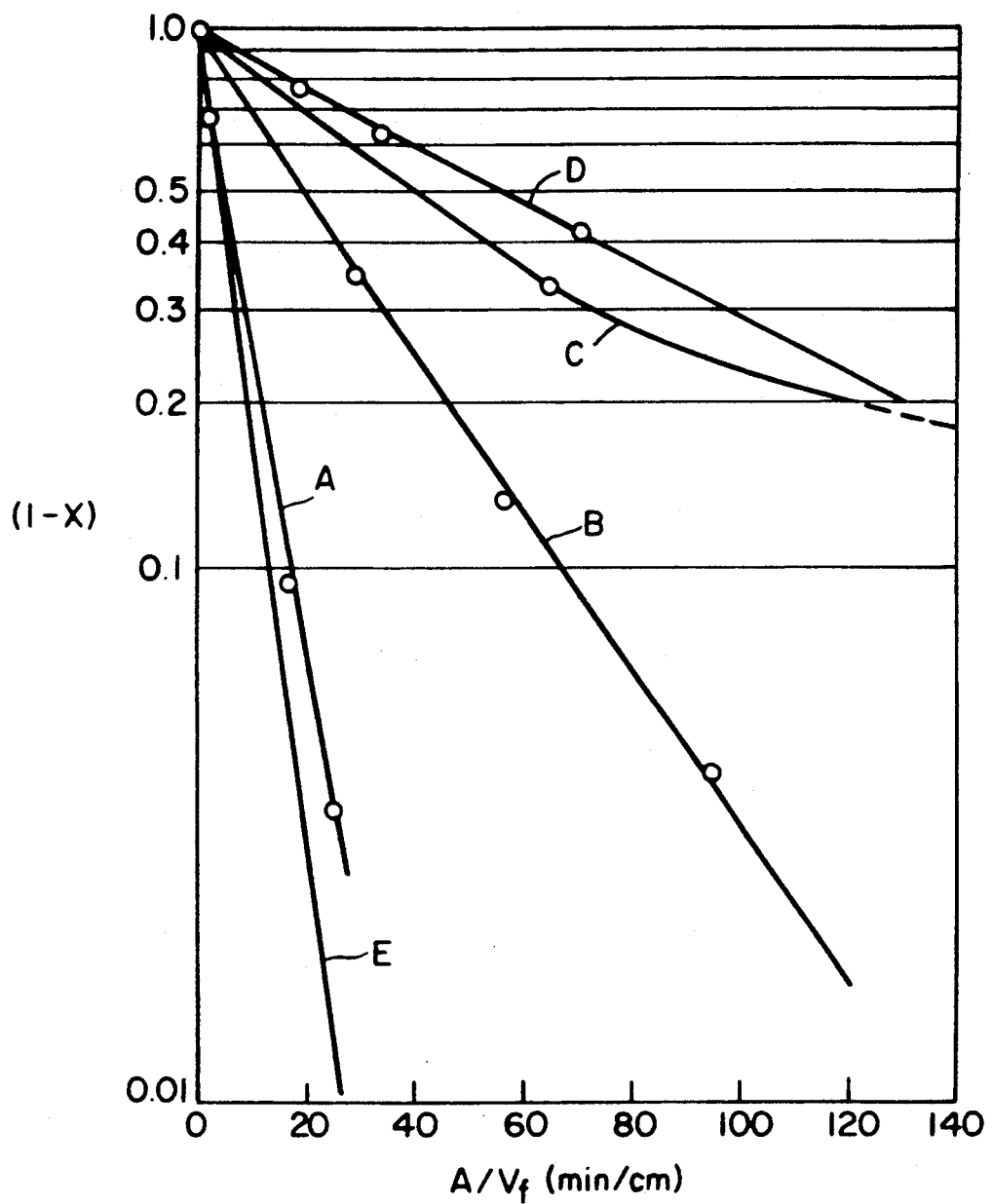
FIG. 8 is a semi-logarithmic plot relating the experimentally determined fractional degree of radon removed in a variety of membrane stripping modules to the membrane areas in those modules and to the flowrate of water being treated.

FIG. 8 is a series semi-logarithmic plots (A-E) relating the experimentally determined fractional degree of radon removed in a variety of membrane stripping modules to the membrane areas in those modules and to the flowrate of water being treated.

EXAMPLE 1

Radon Removal With a Non-Porous Silicone Rubber Membrane.

A Sci-Med Model No. 0400-2A membrane oxygenator (Sci-Med Life Systems, Inc., Minneapolis, Minn.) was employed in this example. It contained 0.4 $m^2$ of a nonporous (i.e., "dense") film prepared from pure dimethylsilicone rubber (polydimethylsiloxane); the effective thickness of this film as given by the manufacturer is 3 mils (approximately 76 microns). As explained above, this module was unique among those tested inasmuch as it contained flat-sheet membrane (as opposed to hollow fibers) packaged in a spiral-wound configuration. Water was made to flow axially through the unit between adjacent turns of the PDMS membrane envelope, while stripping air executed a spiral flow path within the spacer material inside the PDMS membrane envelope. Thus, air and water flows were essentially crosscurrent.

The test began by directing feed water containing about 15,290 pCi/L of dissolved radon gas through the membrane module at an "initial" flowrate of 255 mL/min (the average of two values measured by collection). The water exit pressure was controlled at 0.6 psig by adjusting the throttle valve; the water pressure measured at the inlet to the module was 1.1 psig (corresponding to a water-side pressure drop within the module of about 0.5 psig). Next, stripping air was passed into the module on the opposite side of the PDMS membrane contained therein, and its flowrate was adjusted to about 1.01 Lpm (measured at normal temperature and pressure by water displacement). The exiting air stream was at atmospheric pressure, while the stripping air inlet pressure was found to be slightly less than 0.5 psig. Thus, the membrane operated with a higher pressure on the water stream being treated—i.e., at a small but positive water-to-air-side transmembrane pressure difference.

After 7-8 L of water had been passed through the membrane module, a 1 L sample of the air-stripped water was collected, along with a 1 L sample of feed water for use in calibrating the gamma-emission-based Rn assay. The "final" water flowrate was remeasured after sample collection and determined to be 227 mL/min. An average of the "initial" and "final" water flowrates (i.e., 241 mL/min) was used in the calculation of the module's overall Rn mass transfer coefficient (see below). Additional feed and exit water samples were taken in a similar manner at lower water flowrates of 160 and 75 mL/min to determine the effect of flowrate on radon removal efficiency; exit water pressure and stripping air flowrate were unchanged during these measurements.

Water samples were next contacted with an activated carbon adsorbent for several hours, and gamma radiation emitted by the .GAC was subsequently measured. Concentrations of radon in the membrane-treated water were determined as discussed above, and the fractional radon removal "X" was calculated from the ratio of outlet to inlet concentrations. Results are summarized in Table V.

TABLE V.

RADON REMOVAL WITH A NON-POROUS SILICONE RUBBER MEMBRANE (SCI-MED MODEL 0400-2A)
Membrane Area A = 4000 cm$^2$

| Water Flowrate (cm$^3$/min) | A/V$_f$ (min/cm) | Fraction Rn Removed (X) | Fraction Rn Remaining (1 − X) |
|---|---|---|---|
| 75. | 53.3 | 0.994 | 0.006 |
| 160. | 25.0 | 0.965 | 0.035 |
| 241. | 16.6 | 0.907 | 0.093 |

These data were plotted on semilogarithmic coordinates (see FIG. 8, and Plot A) and analyzed by the procedure described above. It may be seen that the data do indeed fall on a straight line when handled in this manner, confirming the validity of the mass transfer analysis and the method of data reduction. The negative of the slope of the line shown for this unit in FIG. 8 yields a value of 0.0134 cm/min ($2.24 \times 10^{-3}$ cm/sec) for the overall radon mass transfer coefficient of this module containing a dense film of PDMS membrane with an effective thickness of 76 microns (see Table X). From this experimental result and design equations presented above, the radon removal performance of this module can be calculated for any particular water flowrate.

EXAMPLE 2

Radon Removal with a Microporous, Hydrophobic Polypropylene Hollow Fiber Membrane Module A microporous, hydrophobic polypropylene membrane in the form of hollow-fibers packaged in a module with an effective area of 1.3 m$^2$ was obtained from the Questar Division of the Hoechst-Celanese Corp. (Charlotte, N.C.). The X20 HF membrane contained in this unit had a nominal hollow fiber wall thickness of 1 mil (25 microns) and an inner diameter of 240 microns. The nominal membrane pore size was reported to be 0.03 microns, with a porosity of about 40%. Because of the small membrane pore size and the hydrophobic nature of the polypropylene material from which the membrane was made, the initially dry pores resisted wetting by water during the experiments described below.

Feed water (at various flowrates) and stripping air (at a flowrate of about 1.65 Lpm at NTP) were supplied to the module in a countercurrent flow configuration, with water directed down the lumen of the hollow fibers and stripping air directed through the shell-side compartment of the membrane module. The exit pressure of the water stream was controlled at a value of about 1 psig, whereas air exited the module at atmospheric pressure. A positive water-to-air transmembrane pressure difference was maintained throughout the test, in order to localize the water/air interface at the lumenal surface of the membrane and so prevent a pressure-driven flux of air across the membrane and into the water stream. For the most part, experimental procedures paralleled those described in Example 1 above. Radon removal efficiency was determined for this microporous, hydrophobic hollow-fiber membrane module at feed water flowrates of 136, 228, and 436 mL/min; results are summarized in Table VI.

TABLE VI.

RADON REMOVAL WITH A MICROPOROUS, HYDROPHOBIC POLYPROPYLENE HOLLOW-FIBER MEMBRANE MODULE
Questar Polypropylene X20 Membrane
Membrane Area A = 13,000 cm$^2$

| Water Flowrate (cm$^3$/min) | A/V$_f$ (min/cm) | Fraction Rn Removed (X) | Fraction Rn Remaining (1 − X) |
|---|---|---|---|
| 136. | 95.6 | 0.960 | 0.040 |
| 228. | 57.0 | 0.869 | 0.131 |
| 436. | 29.8.6 | 0.655 | 0.345 |

These data were plotted on semilogarithmic coordinates (see FIG. 8, Plot B) and analyzed by the procedure described above. The negative of the slope of the line shown for this unit in FIG. 8 yields a value of 0.0342 cm/min ($5.70 \times 10^{-4}$ cm/sec) for the overall radon mass transfer coefficient of this module containing a 25-micron-thick microporous, hydrophobic polypropylene hollow fiber membrane (see Table X). This value is about 25% that of the corresponding value for the spiral-wound module containing dense PDMS membrane described in Example 1.

EXAMPLE 3

Radon Removal with a Gel Type, Hydrophilic Cellulosic Hollow-Fiber Membrane Module In this experiment, a commercially available hemodialysis hollow-fiber membrane module was evaluated for its radon removal performance. The module used was designated AM-300M by its manufacturer, Asahi Medical Co. (Tokyo, Japan); it is distributed in the U.S. by Mediflex International, Inc. (West Caldwell, N.J.). It contained approximately 1.5 m$^2$ of gel-type regenerated cellulose membrane in the form of hollow fibers; such hemodialysis fiber typically has an inner diameter of about 220 microns and a wall thickness of about 25 microns (both measured wet).

It should be noted that pore size and porosity are not meaningful in characterizing this type of membrane. Cellulosic dialysis films and fibers are probably best envisioned as a highly swollen polymeric membrane gel capable of passing microsolutes (e.g., urea) but rejecting macrosolutes (e.g., proteins) in their typical application to hemodialysis. Because the cellulosic polymer is very hydrophilic and water-swollen, such membranes are highly permeable to water when a transmembrane pressure difference is applied, despite the fact that such membranes do not possess discrete membrane pores. The membrane contained in the AM-300M module was reported to have a water ultrafiltration rate of 4.3 mL/hr-m$^2$-mmHg.

Feed water (at various flowrates) and stripping air (at a flowrate of from 230 to 400 mL/min at NTP) were supplied to this module in a countercurrent flow configuration, with water directed down the lumen of the hollow fibers and stripping air directed through the shell-side compartment of the membrane module. Because the cellulosic membrane was hydrophilic and therefore wet by water, it was necessary to maintain a positive air-to-water transmembrane pressure difference at all points within the membrane module—i.e., to operate with stripping air at a pressure somewhat higher than that of the water stream being treated. This was accomplished by throttling the back-pressure-control needle valve on the exiting air stream to maintain an air exit pressure of about 1.1 to 1.5 psig. Water was discharged to atmospheric pressure. Since the water stream pressure drop within the module never exceeded about 1.0 psig, a positive air-to-water pressure difference was ensured (i.e., exit air pressure always higher than inlet water pressure). Operation in this manner prevented any pressure-driven flux of water across the membrane during the radon stripping operation and fixed the water/air interface at the shell-side surface of the water-swollen hollow-fiber membrane.

Experimental procedures paralleled those described in Example 1 above. Radon removal efficiency was determined for this gel-type, hydrophilic hollow-fiber membrane module at feed water flowrates of 37, 79, and 230 mL/min with the results shown in Table VII.

TABLE VII.

RADON REMOVAL WITH A MICROPOROUS, HYDROPHILIC CELLULOSIC HOLLOW-FIBER MEMBRANE MODULE
Asahi Medical AM-300M Hemodialysis Module
Membrane Area A = 15,000 cm$^2$

| Water Flowrate (cm$^3$/min) | A/V$_f$ (min/cm) | Fraction Rn Removed (X) | Fraction Rn Remaining (1 − X) |
|---|---|---|---|
| 37 | 401 | 0.977 | 0.023 |
| 79 | 189 | 0.888 | 0.112 |
| 230 | 65 | 0.673 | 0.327 |

These data were plotted on semilogarithmic coordinates (see FIG. 8, Plot C) and analyzed by the procedure described above. The negative of the slope of the line shown for this unit in FIG. 8 yields a value of 0.0171 cm/min (2.86×10$^{-4}$ cm/sec) for the overall radon mass transfer coefficient of this module containing a 25-micron-thick regenerated cellulose hollow fiber membrane (see Table X). This value is about 13% that of the corresponding value for the spiral-wound module containing dense PDMS membrane described in Example 1.

EXAMPLE 4

Radon Removal with a Micropororous, Hydrophilic Polyacrylonitrile Hollow-Fiber Membrane Module In this experiment, a commercially available membrane solvent extraction hollow-fiber membrane module was evaluated for its radon removal performance. The device used was designated Model LP by its manufacturer, Sepracor, Inc. (Marlborough, Mass.) and is sold for use in Sepracor's MSX-500 laboratory system for membrane solvent extraction (MSX) process development. This membrane module contained approximately 0.75 m$^2$ (based on inner area) of a microporous hollow fiber fashioned from a hydrophilic copolymer consisting primarily of polyacrylonitrile (PAN). The membrane structure is known to be asymmetric (as opposed to isotropic), consisting of a protein-retentive "skin" layer on its lumenal surface which is supported by a 50-micron-thick porous wall region characterized by submicron pores. The inner diameter of the hollow fibers is 205 microns. Membranes with similar chemistries and morphologies are used in hemofiltration applications and are commercially available from Asahi Medical Co. (e.g., their Model PAN-150 hemofilter).

Because the polyacrylonitrile copolymer membrane of the Model LP module is hydrophilic and porous, the membrane is highly permeable to water if a transmembrane pressure is applied. The microporous membrane contained in the Model LP module was found to have a water ultrafiltration rate of 46 mL/hr-m$^2$-mmHg, about ten times higher than that of the gel-type hydrophilic cellulosic membrane used in Example 3 above.

Feed water (at various flowrates) and stripping air (at a flowrate of from 320 to 330 mL/min at NTP) were supplied to this module in a countercurrent flow configuration, with water directed down the lumen of the hollow fibers and stripping air directed through the shell-side compartment of the membrane module. Because the PAN-copolymer membrane was hydrophilic and therefore wet by water in use, it was necessary to maintain a positive air-to-water transmembrane pressure difference at all points within the membrane module—i.e., to operate with stripping air at a pressure somewhat higher than that of the water stream being treated. This was accomplished by throttling the back-pressure-control needle valve on the exiting air stream to maintain an air exit pressure of about 1.9 to 2.0 psig. Water was discharged to atmospheric pressure. Since the water stream pressure drop within the module varied from 0.5 to 1.7 psig, a positive air-to-water pressure difference was ensured (i.e., exit air pressure always higher than inlet water pressure). Operation in this manner prevented any pressure-driven flux of water across the membrane during the radon stripping operation and fixed the water/air interface at the shell-side surface of the water-swollen hollow-fiber membrane.

Experimental procedures paralleled those described in Example 1 above. Radon removal efficiency was determined for this microporous, hydrophilic hollow-fiber membrane module at feed water flowrates of 105, 217, and 385 mL/min with the results shown in Table VIII.

TABLE VIII.

RADON REMOVAL WITH A MICROPOROUS, HYDROPHILIC PAN-COPOLYMER HOLLOW-FIBER MEMBRANE MODULE
Sepracor Model LP MSX Module
Membrane Area A = 7,500 cm$^2$

| Water Flowrate (cm$^3$/min) | A/V$_f$ (min/cm) | Fraction Rn Removed (X) | Fraction Rn Remaining (1 − X) |
|---|---|---|---|
| 105 | 71.4 | 0.590 | 0.410 |
| 217 | 34.6 | 0.374 | 0.626 |
| 385 | 19.5 | 0.229 | 0.771 |

These data were plotted on semilogarithmic coordinates (see FIG. 8, Plot D) and analyzed by the procedure described above. The negative of the slope of the line shown for this unit in FIG. 8 yields a value of 0.0126 cm/min (2.10×10$^{-4}$ cm/sec) for the overall radon mass transfer coefficient of this module containing a 50-micron-thick polyacrylonitrile hollow fiber membrane (see Table X). This value is about 9% that of the corresponding value for the spiral-wound module containing dense PDMS membrane described in Example 1.

EXAMPLE 5

Fabrication of a Composite Hollow Fiber Membrane Module Based on a Silicone Copolymer In this example, an experimental composite membrane module was prepared in which a silicone/polycarbonate copolymer film was deposited by solution coating procedures onto a microporous PAN support fiber. The PAN support membrane was identical to that described in Example 4 above. However, a module with a much smaller effective membrane area (75 cm$^2$ based on inner diameter) was employed in the present example. This experimental module consisted of about 225 hollow fibers (205 microns ID, 50 microns wall thickness) with an effective length of about 5.2 cm. The materials of construction of the module (namely, nylon and epoxy) were chosen to be resistant to the effects of the methylene chloride solvent subsequently used in the coating procedure described below.

The PAN support membrane was coated by contacting it with a 4.0 wt % solution of a solvent-castable silicone copolymer in methylene chloride. The particular polymer used was obtained as a sample from the Membrane Products Operation of the General Electric Company (Schenectady, N.Y.); that company's designation for this material is "MEM-213." It is known to consist of a block copolymer of polydimethylsiloxane (PDMS or "silicone rubber") and bisphenol-A polycarbonate (i.e., the material in General Electric's Lexan ® polymer); the dimethyl siloxane content of this material is about 55% by weight. This block copolymer is solvent castable and a good film-former.

The coating operation consisted of loading (by means of a 50 mL syringe) either the shell or lumen compartments of the PAN membrane module with the silicone/polycarbonate solution, and simultaneously applying a modest vacuum (generated by a water aspirator) to the opposite compartment. The small transmembrane pressure difference so applied caused some penetration of the silicone copolymer solution into the membrane pores, at the same time as the highly volatile methylene chloride solvent was being evaporated from the solution. After a minute or two of such exposure, excess polymer solution was blown out of the membrane module with air. The remaining solvent was evaporated by simultaneously blowing compressed air through that compartment originally containing the polymer solution and by continuing to apply a vacuum to the opposite surface of the membrane. This procedure was repeated as necessary until a silicone copolymer film had been deposited which could be shown to be impermeable to bulk water (see below). The particular module prepared here (and subsequently tested for its radon removal ability in Example 6) was first exposed to the coating polymer solution on the shell side, and then subsequently exposed an additional two times to coating polymer solution on the lumen side of the PAN support fiber.

In order to verify that the lumen compartment of the module had not become obstructed with dried polymer solution during the coating procedure, the "axial conductance" of the module—defined as the flowrate of water that could be passed through the fiber-lumens of module per unit of applied pressure drop—was measured for both coated and uncoated modules and compared. The final value of the "after coating" axial conductance measured for the test module of Examples 5 and 6 was 1.58 mL/min-inch H$_2$O, which compares favorably with the value of 1.66 mL/min-inch H$_2$O measured for an uncoated module. Hence, the lumen compartment of the coated module was not obstructed by the solution coating procedure.

In order to verify that an integral film of silicone copolymer had been deposited upon the PAN support fiber, the hydraulic permeability of the fiber in the module was measured after each coating step and compared with the value for an uncoated, "control" module. Measurements were made by (i) filling the module with water and closing one of the lumen-side ports, (ii) attaching a length of plastic tubing to one of the lumen-side ports of the module and filling it with water, (iii) elevating the open length of water-filled tubing to apply a hydrostatic pressure to the lumenal compartment, and (iv) measuring the rate of water ultrafiltration into the shell compartment by monitoring the rate at which the water fell in the attached tubing.

Whereas the hydraulic permeability of uncoated modules was generally about 40 mL/min-m$^2$-psi, the first coating operation resulted in an approximately 20-fold decrease in the hydraulic permeability of the module (to 1.7 ml/min-m$^2$-psi). The hydraulic permeability of the module after the final coating operation was immeasurable by this technique, and thus the module was judged suitable for evaluation of its radon removal performance.

EXAMPLE 6

Radon Removal with a Composite Hollow-Fiber Membrane Module Based on a Silicone Copolymer In this example, the composite hollow-fiber membrane module prepared in Example 6 by coating a silicone/polycarbonate copolymer atop a PAN support membrane was tested for its ability to remove waterborne radon.

Feed water (at an average flowrate of 32 mL/min) and stripping air (at a flowrate of about 1.65 Lpm at NTP) were supplied to the module in a countercurrent flow configuration, with water directed down the lumen of the hollow fibers and stripping air directed through the shell-side compartment of the membrane module. The module exit pressure of the water stream was controlled hydrostatically at a value of about 0.5 psig (by discharging it at a level of 29 inches above the centerline of the membrane module); the resulting inlet water pressure was about 1.5 psig at the conditions of the test, consistent with a 1.0 psi water-side pressure drop across the module. Stripping air exited the module at atmospheric pressure. Thus, a positive water-to-air transmembrane pressure difference was maintained throughout the test. However, no pressure-driven convective transmembrane flux of water occurred during the test despite the microporous and hydrophilic nature of the PAN support fiber for the reason that the nonporous silicone/polycarbonate coating proved impermeable to bulk water transport.

For the most part, experimental procedures paralleled those described in Example 1 above. One exception is that a foil-lined plastic sampling bag was used to collect the exiting water sample. This allayed concerns that residual radon might otherwise be lost from the sample at the low water flowrate of the test (made necessary by the small device size). Radon removal efficiency was determined for this 75 cm$^2$ composite hollow-fiber membrane module at a single feed water flowrate of 32 mL/min with the result shown in Table IX.

TABLE IX.

RADON REMOVAL WITH A COMPOSITE HOLLOW-FIBER MEMBRANE MODULE BASED ON A SILICONE COPOLYMER

Nonporous Silicone/Polycarbonate Copolymer Film on a Microporous PAN Hollow-Fiber Support Membrane

TABLE IX.-continued
RADON REMOVAL WITH A COMPOSITE HOLLOW-FIBER MEMBRANE MODULE BASED ON A SILICONE COPOLYMER Membrane Area A = 75 cm$^2$

| Water Flowrate (cm$^3$/min) | A/V$_f$ (min/cm) | Fraction Rn Removed (X) | Fraction Rn Remaining (1 − X) |
|---|---|---|---|
| 32 | 2.34 | 0.322 | 0.678 |

This datum was plotted on semilogarithmic coordinates (see FIG. 8, Plot E) for comparison with the performance of the other modules tested, and results were analyzed by the procedure described above. The negative of the slope of the line shown for this unit in FIG. 8 yields a value of 0.166 cm/min (2.77×10$^{-3}$ cm/sec) for the overall radon mass transfer coefficient of this module containing a composite silicone(PDMS)/polycarbonate-on-PAN hollow fiber membrane (see Table X). This value is about 124% that of the corresponding value for the spiral-wound module containing dense PDMS membrane described in Example 1.

Overall radon mass transfer coefficients determined in the above Examples for various membrane types and module designs are summarized in Table X below. It can be seen that measured coefficients vary by more than a factor of 13 from the best performing device (the hollow-fiber module containing the PAN-supported silicone-based composite membrane) to the worst (the Model LP module containing microporous, hydrophilic PAN hollow fiber). The results of these Examples support the superiority of membranes based on nonporous silicone-rubber-containing polymers relative to porous membranes. The experimental results further indicate that, among the family of porous membranes, those based on hydrophobic and non-wetted polymers such as polypropylene are to be preferred over hydrophilic ones (e.g., regenerated cellulose and hydrophilic PAN copolymers) from the point of view of radon removal capacity. Both hollow-fiber (e.g., the experimental composite and the Questar devices) and spiral-wound (e.g., Sci-Med) membrane module designs have been shown capable of yielding high radon removal mass transfer coefficients—given their incorporation of suitably Rn-permeable membranes as taught by the present disclosure.

TABLE X.
EXPERIMENTALLY DETERMINED RADON MASS TRANSFER COEFFICIENTS FOR VARIOUS MEMBRANE/MODULE TYPES

| Module Transfer Designation (cm/min) | Membrane Material | Membrane Type | Overall Mass Coefficient |
|---|---|---|---|
| Sci-Med 0400-2A | PDMS (hydrophobic) | Nonporous | 0.134 |
| Questar/Celanese | PP (hydrophobic) | Microporous | 0.0342 |
| Asahi AM-300 | RC (hydrophilic) | Porous (gel-type) | 0.0171 |
| Sepracor Model LP | PAN-based Copolymer (hydrophilic) | Asymmetric, Microporous | 0.0126 |
| Expt'al. Composite | PDMS/PC on PAN Fiber (hydrophobic coating) | Composite (dense coating on porous support) | 0.166 |

REFERENCES CITED

1. "A Citizen's Guide to Radon," EPA Publ. OPA-86-004, Aug., 1986.
2. "Fit to Drink?," Cons. Repts., 55:1 (1990) 27–43.
3. Hanson, D. J., C&E News, Feb. 6, 1989, 7–13.
4. "EPA urges all homes be tested for radon," C&E News, Oct. 23, 1989, 12.
5. "EPA urges schools to test for radon," C&E News, May 1, 1989, 21.
6. "Radon Reduction Methods," EPA Publ. OPA-87-010, Sept 1987.
7. Lowry, J. D. and J. E. Brandow, J. Env. Engr., 111:4 (1985) 511–527.
8. "Removal of Radon from Household Water," EPA Publ. OPA- 87-011, Sept. 1987.
9. Cothern, C. R., J. Am. Water Works Assoc., 79:4 (1987) 153–158.
10. Lowry, J. D. et al., J. Am. Water Works Assoc., 79:4 (1987) 162–169,
11. Aieta, E. M. et al., J. Am. Water Works Assoc., 79:4 (1987) 144–152.
12. Kirk-Othmer Concise Encyclopedia of Chemical Technology, Wiley & Sons, N.Y., 1987, 585–586.
13. Lewis, C. et al., Ind. Eng. Chem. Res., 26 (1987) 356–359.
14. Pritchard, H. M., J. Am. Water Works Assoc., 79:4 (1987) 159–161.
15. Pritchard, H. M. and T.F. Gesell, Health Phys., 33 (1977) 577–581.
16. Pritchard, H. M., Health Phys., 45 (1983) 493–499.
17. Partridge, J. E., et al., "A Study of Radon-222 Released During Typical Household Activities," EPA Publ. ORP/EERF-79-1, Mar., 1979.
18. Horton, T. R., "Methods and Results of EPA's Study of Radon in Drinking Water," EPA Publ. 520/5-83-027, Dec., 1983.
19. Pritchard, H. M. and T. F. Gesell, Health Phys., 41 (1981) 599.
20. Dixon, K. L. and R. G. Lee, J. Am. Water Works Assoc., 80:7 (1988) 65–70.
21. Lowry, J. D., "Adsorption of Radon From Water Supplies," Proceedings of the 1984 National Conference on Environmental Engineering, ASCE, Los Angeles, Calif., June 25-27, 1984.
22. Smith, B. M. et al., J. Am. Water Works Assoc., 53 (1961) 75–88.
23. Becker, A. P. III and T. M. Lachajczyk, "Evaluation of Waterborne Radon Impact on Indoor Air Quality and Assessment of Control Options," EPA Publ. EPA-600/7- 84-093, 1984.
24. Gabler, R., Is Your Water Safe to Drink?, Consumers Union, Mount Vernon, N.Y. (1987).
25. Rost, K. L., U.S. Pat. No. 4,371,383, Feb., 1983.
26. Dyksen, J. E., D. J. Hiltebrand and R. Guena, "Treatment Facilities and Costs for the Removal of Radon from Ground Water Supplies," Proceedings of the 1986 Specialty Conference on Environmental Engineering," ASCE, Cincinnati, Ohio, July 8-10, 1986, pp. 510–521.
27. Yang, M.-C. and E. L. Cussler, AIChE J., 32 (1986) 1910–1916.
28. Yang, M.-C. and E. L. Cussler, J. Memb. Sci., 42 (1989) 273–284.
29. Tang, T. E. and S.-T. Hwang, AIChE J., 22 (1976) 1000–1006.
30. Cote, P., J.-L. Bersillon and A. Huyard, J. Memb. Sci., 47 (1989) 91–106.

31. Zhang, Q. and E. L. Cussler, J. Memb. Sci., 23 (1985) 321.
32. King, J. C., Separation Processes, McGraw-Hill, N.Y., 1971.
33. Lonsdale, H. K., J. Memb. Sci , 10 (1982) 81–181.
34. Lee, E. K., "Synthetic Membranes, Applications," Encyclopedia of Physical Science and Technology, 8 (1987) 20–55.
35. Matson, S. L., J. Lopez and J.A. Quinn, Chem. Eng. Sci., 38 (1983) 503–524.
36. Chern, R. T., W. J. Koros, H. B. Hopfenberg and V. T. Stannett, "Material Selection for Membrane-Based Gas Separations," pp 25–46 in *Materials Science of Synthetic Membranes*, D. R. Lloyd, ed., ASC Symp. Ser. 269, American Chemical Society, N.Y., 1985.
37. Bigu, J., Nucl. Insts. Meths. in Phys. Res., A251 (1986) 366–373.
38. Hafez, A.-F. and G. Somogyi, Nuclear Tracks, 12 (1986) 697–700.
39. Ramachandran, T. V., B. Y. Lalit and U. C. Mishra, Nucl. Tracks Radiat. Meas., 13 (1987) 81–84.
40. Jha, G., M. Raghavayya and N. Padmanabhan, Health Physics, 42 (1982) 723–725.
41. Robb, W. L., U.S. Pat. No. 3,274,750, Sept., 1966.
42. "General Electric Permselective Membranes," product brief, GE Membrane Products Operation, Schenectady, N.Y.
43. Ohno, M. et al., Radiochem. Radioanal. Letters, 27 (1976) 299–306.
44. Reid, R. C., J. M. Prausnrtz and B. E. Poling, The Properties of Gases and Liquids, 4th ed., McGraw-Hill, N.Y., 1987.
45. Ward, W. J., et. al., Rev. Sci. Instrum., 48 (1977) 1440–1441.
46. Ward, W. J., U.S. Pat. No. 4,064,436, Dec., 1977.
47. Matson, S. L. et al., J. Memb. Sci., 29 (1986) 79–96.
48. Ward, W. J., W. R. Browall and S. G. Kimura, J. Memb. Sci., 1 (1976) 99.
49. Babcock, W. C, and D. T. Friesen, U.S. Pat. No. 4,781,733, Nov., 1988.
50. Henis, J. M. S. and M. K. Tripodi, Science, 220 (1983) 11–17.
51. Henis, J. M. S. and M. K. Tripodi, U.S. Pat. No. 4,230,463, Oct., 1980.
52. Robb, W. L. and D. L. Reinhard, U.S. Pat. No. 3,335,545, 1965.
53. Waldrop, M. M., Science, Sept. 8, 1989, pp. 1043–1045.
54. King, A. T., B. J. Mulligan and K. C. Lowe, Bio/-Technology 7 (1989) 1037–1042.
55. Barton, A. F. M., Handbook of Solubility Parameters, RC Press, Boca Raton, Fla. 1983.
56. Prausnitz, J. M., Molecular Thermodynamics of Fluid-Phase Equilibria, Prentice-Hall, Englewood Cliffs, N.J., 1969.
57. Brandrup, J. and E. H. Immergut, Polymer Handbook, 3rd ed., Wiley & Sons, New York, 1989.

As will be apparent to those skilled in the art, many modifications and variations of this invention may be made without departing from its spirit and scope. The specific embodiments described herein are offered by way of example only, and the invention is limited only by the terms of the appended claims.

What is claimed is:

1. A system for reducing the naturally-occurring dissolved radon content of radon-containing water supplied from a groundwater source, comprising:
  a) a housing, defining a water inlet, a water outlet, a stripping-air inlet and a stripping-air outlet;
  b) a radon-permeable membrane disposed within the housing, wherein the housing and a first surface of the radon-permeable membrane define a first chamber which provides fluid communication between the water inlet and the water outlet, and wherein the housing and second surface of the radon-permeable membrane define a second chamber which is distinct from the first chamber and which provides fluid communication between the stripping-air inlet and the stripping-air outlet, whereby the radon-permeable membrane maintains separation between radon-containing water passing through the first chamber from the water inlet to the water outlet and stripping air passing through the second chamber from the stripping-air inlet to the stripping-air outlet, while allowing naturally-occurring dissolved radon to migrate from the water through the radon-permeable membrane to the second chamber; and
  c) means for passing stripping air through the second chamber from the stripping-air inlet to the stripping-air outlet, whereby the stripping air transports radon in the second chamber from the second chamber through the stripping-air outlet for discharge to the atmosphere, thereby reducing the naturally-occurring dissolved radon content of the water.

2. A system of claim 1 wherein the radon-permeable membrane comprises silicone rubber.

3. A system of claim 1 wherein the radon-permeable membrane comprises polydimethylsilicone rubber.

4. A system of claim 2 wherein the radon-permeable membrane comprises a block copolymer including silicone rubber.

5. A system of claim 4 wherein the block copolymer further comprises polycarbonate.

6. A system of claim 1 wherein the radon-permeable membrane comprises a composite having a microporous support and a radon-permeable film.

7. A system of claim 6 wherein the first surface comprises the radon-permeable film.

8. A system of claim 6 wherein the radon-permeable film is at least partially disposed within the pores of the microporous support.

9. A system of claim 6 wherein the radon-permeable film comprises a silicone rubber.

10. A system of claim 9 wherein the radon-permeable film comprises polydimethylsilicone rubber.

11. A system of claim 7 wherein the radon-permeable film comprises a block copolymer including a silicone rubber.

12. A system of claim 11 wherein the block copolymer further comprises polycarbonate.

13. A system for reducing the naturally-occurring dissolved radon content of radon-containing water supplied from a groundwater source, comprising:
  a) a housing, defining a water inlet, a water outlet, a stripping-air inlet and a stripping-air outlet;
  b) a radon-permeable non-porous silicone-containing membrane disposed within the housing, wherein the housing and a first surface of the radon-permeable non-porous silicone membrane define a first chamber which provides fluid communication between the water inlet and the water outlet, and wherein the housing and second surface of the radon-permeable non-porous silicone membrane define a second chamber which is distinct from the first chamber and which provides fluid communication between the stripping-air inlet and the stripping-air outlet, whereby the radon-permeable non-porous silicone membrane maintains separation between radon-containing water passing through the first chamber from the water inlet to the water outlet and stripping air passing through the second chamber from the stripping-air inlet to the stripping-air outlet, while allowing naturally-occurring dissolved radon to migrate from the water through the radon-permeable non-porous silicone membrane to the second chamber; and c) means for passing stripping air through the second chamber from the stripping-air inlet to the stripping-air outlet, whereby the stripping air transports radon in the second chamber from the second chamber through the stripping-air outlet for discharge to the atmosphere, thereby reducing the naturally-occurring dissolved radon content of the water.

14. A system for reducing the naturally-occurring dissolved radon content of radon-containing water supplied from a groundwater source, comprising:

a) a housing, defining a water inlet, a water outlet, a stripping-air inlet and a stripping-air outlet;

b) a radon-permeable composite membrane having a microporous support and a silicone-containing radon-permeable film, the radon-permeable composite membrane being disposed within the housing, wherein the housing and a first surface, including the radon-permeable film of the radon-permeable composite membrane, define a fist chamber which provides fluid communication between the water inlet and the water outlet, and wherein the housing and second surface, including the microporous support of the radon-permeable composite membrane, define a second chamber which is distinct from the first chamber and which provides fluid communication between the stripping-air inlet and the stripping-air outlet, whereby the radon-permeable composite membrane maintains separation between radon-containing water passing through the first chamber from the water inlet to the water outlet and stripping air passing through the second chamber from the stripping-air inlet to the stripping-air outlet, while allowing naturally-occurring dissolved radon to migrate from the water through the radon-permeable composite membrane to the second chamber; and c) means for passing stripping air through the second chamber from the stripping-air inlet to the stripping-air outlet, whereby the stripping air transports radon in the second chamber from the second chamber through the stripping-air outlet for discharge to the atmosphere, thereby reducing the naturally-occurring dissolved radon content of the water.

15. A system for reducing the naturally-occurring dissolved radon content of radon-containing water supplied from a groundwater source, comprising:

a) a housing, defining a water inlet, a water outlet, a stripping-air inlet and a stripping-air outlet;

b) a radon-permeable microporous hydrophobic membrane disposed within the housing, wherein the housing and a first surface of the radon-permeable microporous hydrophobic membrane define a first chamber which provides fluid communication between the water inlet and the water outlet, and wherein the housing and second surface of the radon-permeable microporous hydrophobic membrane define a second chamber which is distinct from the first chamber and which provides fluid communication between the stripping-air inlet and the stripping-air outlet, whereby the radon-permeable microporous hydrophobic membrane maintains separation between radon-containing water passing through the first chamber from the water inlet to the water outlet and stripping air passing through the second chamber from the stripping-air inlet to the stripping-air outlet, while allowing naturally-occurring dissolved radon to migrate from the water through the radon-permeable microporous hydrophobic membrane to the second chamber; and c) means for passing stripping air through the second chamber from the stripping-air inlet to the stripping-air outlet, whereby the stripping air transports radon in the second chamber from the second chamber through the stripping-air outlet for discharge to the atmosphere, thereby reducing the naturally-occurring dissolved radon content of the water.

16. A system for reducing the naturally-occurring dissolved radon content of radon-containing water supplied from a groundwater source, comprising:

a) a housing, defining a water inlet, a water outlet, a stripping-air inlet and a stripping-air outlet;

b) a radon-permeable membrane which includes an immobilized liquid membrane having a microporous support and a water immiscible radon-permeable liquid disposed within pores of the microporous support, the radon-permeable membrane being disposed within the housing, wherein the housing and a first surface of the radon-permeable membrane define a first chamber which provides fluid communication between the water inlet and the water outlet, and wherein the housing and a second surface of the radon-permeable membrane define a second chamber which is distinct from the first chamber and which provides fluid communication between the stripping-air inlet and the stripping-air outlet, whereby the radon-permeable membrane maintains separation between radon-containing water passing through the first chamber from the water inlet to the water outlet and stripping air passing through the second chamber from the stripping-air inlet to the stripping-air outlet, while allowing naturally-occurring dissolved radon to migrate from the water through the radon-permeable membrane to the second chamber; and c) means for passing stripping air through the second chamber from the stripping-air inlet to the stripping-air outlet, whereby the stripping air transports radon in the second chamber from the second chamber through the stripping-air outlet for discharge to the atmosphere, thereby reducing the naturally-occurring dissolved radon content of the water.

17. A system of claim 16 wherein the radon-permeable liquid includes a silicone fluid.

18. A system of claim 16 wherein the radon-permeable membrane includes a sheet.

19. A system of claim 16 wherein the radon-permeable membrane includes at least one tube.

20. A method of reducing the naturally-occurring dissolved radon content of radon-containing water supplied from a groundwater source, comprising the steps of:
  a) passing the radon-containing water from a water inlet to a water outlet of a first chamber, which is defined by a housing and a first surface of a radon-permeable membrane disposed within the housing, the first chamber providing fluid communication between the water inlet and the water outlet, whereby the radon-containing water passes over the first surface of the radon-permeable membrane; and
  b) passing stripping air from a stripping-air inlet to a stripping-air outlet of a second chamber, which is defined by the housing and a second surface of the radon-permeable membrane and which provides fluid communication between the stripping-air inlet and the stripping-air outlet, the radon-permeable membrane maintaining separation between the radon-containing water passing through the first chamber and the stripping air passing through the second chamber, while allowing naturally-occurring dissolved radon to migrate from the water through the radon-permeable membrane to the stripping air, whereby the stripping air passes over the second surface of the radon-permeable membrane and transports the radon through the stripping-air outlet for discharge of the radon to the atmosphere, thereby reducing the naturally-occurring dissolved radon content of the water.

21. A method of claim 20 wherein the pressure of the stripping air is substantially lower than the pressure of the radon-containing water.

22. A method of claim 21 wherein the pressure of the stripping air is about atmospheric and the pressure of the radon-containing water is in the range of between about ten and about one hundred psig.

23. A method of claim 22 wherein the pressure of the radon-containing water is in the range of between about twenty and about eighty psig.

24. A method of reducing the naturally-occurring dissolved radon content of radon-containing water supplied from a groundwater source, comprising the steps of:
  a) passing the radon-containing water from a water inlet to a water outlet of a first chamber, which is defined by a housing and a first surface of a radon-permeable non-porous silicone-containing membrane disposed within the housing, the first chamber providing fluid communication between the water inlet and the water outlet, whereby the radon-containing water passes over the first surface of the radon-permeable non-porous silicone-containing membrane; and
  b) passing stripping air from a stripping-air inlet to a stripping-air outlet of a second chamber, which is defined by the housing and a second surface of the radon-permeable non-porous silicone-containing membrane and which provides fluid communication between the stripping-air inlet and the stripping-air outlet, the radon-permeable non-porous silicone-containing membrane maintaining separation between the radon-containing water passing through the first chamber and the stripping air passing through the second chamber, while allowing naturally-occurring dissolved radon to migrate from the water through the radon-permeable non-porous silicone-containing membrane to the stripping air, whereby the stripping air passes over the second surface of the radon-permeable non-porous silicone-containing membrane and transports the radon through the stripping-air outlet for discharge of the radon to the atmosphere, thereby reducing the naturally-occurring dissolved radon content of the water.

25. A method of reducing the naturally-occurring dissolved radon content of radon-containing water supplied from a groundwater source, comprising the steps of:
  a) passing the radon-containing water from a water inlet to a water outlet of a first chamber, which is defined by a housing and a first surface of a radon-permeable composite membrane disposed within the housing, the first surface including a radon-permeable film of the radon-permeable composite membrane, the first chamber providing fluid communication between the water inlet and the water outlet, whereby the radon-containing water passes over the first surface of the radon-permeable composite membrane; and
  b) passing stripping air from a stripping-air inlet to a stripping-air outlet of a second chamber, which is defined by the housing and a second surface of the radon-permeable composite membrane, the second surface including a microporous support of the radon-permeable composite membrane, the second chamber providing fluid communication between the stripping-air inlet and the stripping-air outlet, the radon-permeable composite membrane maintaining separation between the radon-containing water passing through the first chamber and the stripping air passing through the second chamber, while allowing naturally-occurring dissolved radon to migrate from the water through the radon-permeable composite membrane to the stripping air, whereby the stripping air passes over the second surface of the radon-permeable composite membrane and transports the radon through the stripping-air outlet for discharge of the radon to the atmosphere, thereby reducing the naturally-occurring dissolved radon content of the water.

26. A method of reducing the naturally-occurring dissolved radon content of radon-containing water supplied from a groundwater source, comprising the steps of:
  a) passing the radon-containing water from a water inlet to a water outlet of a first chamber, which is defined by a housing and a first surface of a radon-permeable microporous hydrophobic membrane disposed within the housing, the first chamber providing fluid communication between the water inlet and the water outlet, whereby the radon-containing water passes over the first surface of the radon-permeable microporous hydrophobic membrane; and
  b) passing stripping air from a stripping-air inlet to a stripping-air outlet of a second chamber, which is defined by the housing and a second surface of the radon-permeable microporous hydrophobic membrane and which provides fluid communication between the stripping-air inlet and the stripping-air outlet, the radon-permeable microporous hydrophobic membrane maintaining separation between the radon-containing water passing through the first chamber and the stripping air passing through the second chamber, while allowing naturally-occurring dissolved radon to migrate from the water through the radon-permeable microporous hydrophobic membrane to the stripping air, whereby the stripping air passes over the second surface of the radon-permeable microporous hydrophobic membrane and transports the radon through the stripping-air outlet for discharge of the radon to the atmosphere, thereby reducing the naturally-occurring dissolved radon content of the water.

27. A method for reducing the naturally-occurring dissolved radon content of radon-containing water supplied from a groundwater source, comprising the steps of:
 a) passing the radon-containing water from a water inlet to a water outlet of a first chamber, which is defined by a housing and a first surface of a radon-permeable membrane disposed within the housing, the radon-permeable membrane including an immobilized liquid membrane having a microporous support and a water-immiscible radon-permeable liquid disposed within pores of the microporous support, the first chamber providing fluid communication between the water inlet and the water outlet, whereby the radon-containing water passes over the first surface of the radon-permeable membrane; and
 b) passing stripping air from a stripping-air inlet to a stripping-air outlet of a second chamber, which is defined by the housing and a second surface of the radon-permeable membrane and which provides fluid communication between the stripping-air inlet and the stripping-air outlet, the radon-permeable membrane maintaining separation between the radon-containing water passing through the first chamber and the stripping air passing through the second chamber, while allowing naturally-occurring dissolved radon to migrate from the water through the radon-permeable membrane to the stripping air, whereby the stripping air passes over the second surface of the radon-permeable membrane and transports the radon through the stripping-air outlet for discharge of the radon to the atmosphere, thereby reducing the naturally-occurring dissolved radon content of the water.

28. In a method of reducing the dissolved radon content of radon-containing water:
the improvement comprising passing the radon-containing water from a water inlet to a water outlet of a first chamber, which is defined by a housing and a first surface of a radon-permeable membrane disposed within the housing, the first chamber providing fluid communication between the water inlet and the water outlet, whereby the radon-containing water passes over the first surface of the radon-permeable membrane, and passing stripping air from a stripping-air inlet to a stripping-air outlet of a second chamber, which is defined by the housing and a second surface of the radon-permeable membrane and which provides fluid communication between the stripping-air inlet and the stripping-air outlet, the radon-permeable membrane maintaining separation between the radon-containing water passing through the first chamber and the air passing through the second chamber, while allowing naturally-occurring dissolved radon from a ground water source to migrate from the water through the radon-permeable membrane to the stripping air, whereby the stripping air passes over the second surface of the radon-permeable membrane and transports radon from the second chamber through the stripping-air outlet for discharge of the radon to the atmosphere, thereby reducing the naturally-occurring dissolved radon content of the water.

* * * * *